(12) United States Patent
Tada et al.

(10) Patent No.: US 12,512,700 B2
(45) Date of Patent: Dec. 30, 2025

(54) COMMUNICATION SYSTEM AND ELECTRONIC CONTROL DEVICE

(71) Applicant: DENSO CORPORATION, Kariya (JP)

(72) Inventors: Akira Tada, Kariya (JP); Tomohisa Kishigami, Kariya (JP); Tomoya Tokunaga, Kariya (JP); Ryota Kameoka, Kariya (JP); Taku Inagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/910,032

(22) Filed: Oct. 9, 2024

(65) Prior Publication Data

US 2025/0125652 A1    Apr. 17, 2025

(30) Foreign Application Priority Data

Oct. 13, 2023 (JP) ................. 2023-177563

(51) Int. Cl.
  *H02J 13/00* (2006.01)
  *B60R 16/03* (2006.01)

(52) U.S. Cl.
  CPC .. *H02J 13/00036* (2020.01); *H02J 13/00002* (2020.01); *B60R 16/03* (2013.01); *H02J 2310/40* (2020.01)

(58) Field of Classification Search
  CPC ........... H02J 13/00036; H02J 13/00002; H02J 2310/40; B60R 16/03
  See application file for complete search history.

(56) References Cited

U.S. PATENT DOCUMENTS 8,078,331 B2 * 12/2011 Sakane .................. H02H 3/087
                                                    713/300
2015/0112510 A1   4/2015 Tokunaga et al.

FOREIGN PATENT DOCUMENTS

JP     2015-081021 A    4/2015

OTHER PUBLICATIONS

U.S. Appl. No. 18/910,026, filed Oct. 9, 2024, Tada et al.
U.S. Appl. No. 18/910,041, filed Oct. 9, 2024, Tada et al.

* cited by examiner

*Primary Examiner* — Carlos Amaya
(74) *Attorney, Agent, or Firm* — Harness, Dickey & Pierce, P.L.C.

(57) ABSTRACT

A communication system includes a first controller and a second controller connected to each other. The first controller receives electric power from a power source through a power switch. The second controller includes a current detection unit, the management frame obtaining unit, the disconnection determination unit, and the power supply disconnection unit. The current detection unit detects a consumed current value of the first controller. The management frame obtaining unit obtains a management frame including activation information of the first controller. The disconnection determination unit determines, based on the consumed current value and the activation information, whether a predetermined disconnection condition is met. The power supply disconnection unit switches the power switch to a disconnected state when the disconnection determination unit determines that the disconnection condition is met.

9 Claims, 17 Drawing Sheets

FIG. 2

| | DLC | | | | | | | DATA | | | | | | |
|---|---|---|---|---|---|---|---|---|---|---|---|---|---|---|
| AFFILIATION INFORMATION | 0 | 0 | 1 | 1 | 0 | 1 | 1 | 0 | 1 | 0 | 0 |
| | | | Groups: | 1 | 2 | 3 | 4 | 5 | 6 | 7 | 8 |
| ACTIVATION INFORMATION | 0 | 0 | 0 | 1 | 0 | 1 | 1 | 1 | 0 | 0 | 0 |

FIG. 6

| CONTROL TARGET | 1ST CLUSTER | 2ND CLUSTER | 3RD CLUSTER | 4TH CLUSTER | 5TH CLUSTER | 6TH CLUSTER | 7TH CLUSTER |
|---|---|---|---|---|---|---|---|
| E-FUSE 15 (ECU 3) | ✓ | | | | | | |
| ECU 6 | ✓ | ✓ | | | | | |
| E-FUSE 16 (ECU 4) | | ✓ | ✓ | ✓ | | | |
| E-FUSE 504 (SENSOR 501) | | | | | ✓ | ✓ | |
| E-FUSE 505 (ACTUATOR 502) | | | | | | | ✓ |

COMMUNICATION SYSTEM AND ELECTRONIC CONTROL DEVICE

CROSS REFERENCE TO RELATED APPLICATION

The present application claims the benefit of priority from Japanese Patent Application No. 2023-177563 filed on Oct. 13, 2023, and Japanese Patent Application No. 2024-146927 filed on Aug. 28, 2024. The entire disclosure of the above application is incorporated herein by reference.

TECHNICAL FIELD

The present disclosure relates to a communication system including multiple controllers.

BACKGROUND

There is an in-vehicle network system that includes a power relay for selectively switching the power of the multiple electronic controllers.

SUMMARY

A communication system includes a first controller and a second controller. The first controller receives an electric power from a power source via a power switch that is configured to switch between a connected state in which a power supply path is electrically connected to the power source and a disconnected state in which the power supply path is electrically disconnected from the power source. The second controller is connected to the first controller to exchange a communication frame and configured to control the power switch. The second controller includes a current detection unit, a management frame obtaining unit, a disconnection determination unit, and a power supply disconnection unit. The current detection unit is configured to repeatedly detect a current value, as a consumed current value, that is consumed by the first controller. The management frame obtaining unit is configured to obtain a management frame, as a communication frame, that includes activation information related to activation of the first controller. The disconnection determination unit is configured to determine, based on the consumed current value and the activation information, whether a predetermined disconnection condition is met. The predetermined disconnection condition indicates that the first controller keeps consuming a large amount of power but the first controller is in a sleep state. The power supply disconnection unit is configured to switch the power switch to the disconnected state when the disconnection determination unit determines that the predetermined disconnection condition is met.

BRIEF DESCRIPTION OF THE DRAWINGS

FIG. 2 is an explanatory diagram illustrating affiliation information and activation information.

FIG. 6 is a diagram illustrating a correspondence relationship between a control target and a cluster.

DETAILED DESCRIPTION

Figure 1:
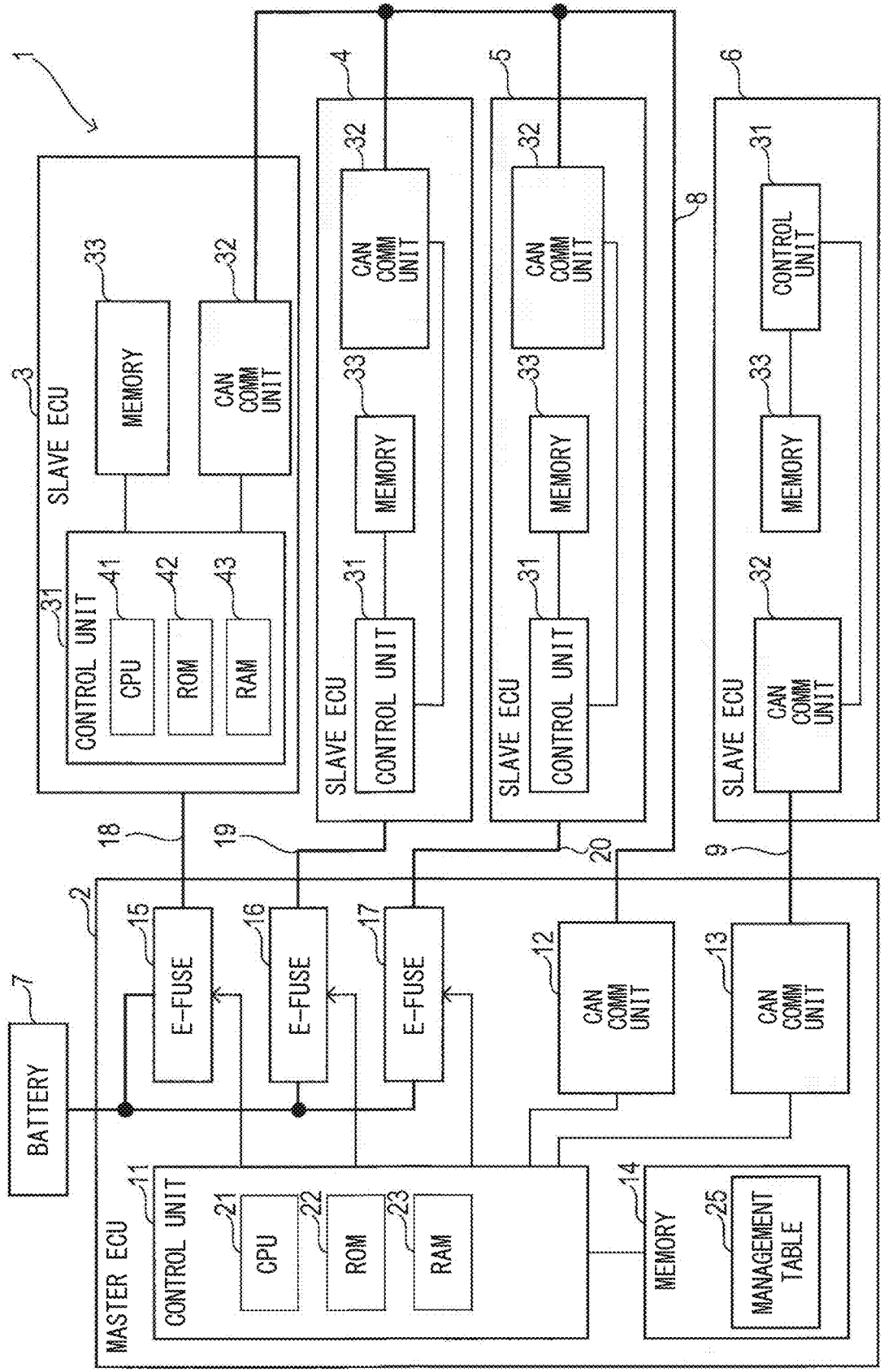
FIG. 1 is a block diagram showing a configuration of a communication system.

To begin with, examples of relevant techniques will be described.

There is an in-vehicle network system that includes a power relay for selectively switching the power of the multiple electronic controllers. The in-vehicle network system determines control contents regarding switching of the power of a specified electronic controller, which corresponds to a scene selected based on a vehicle situation. The in-vehicle network system switches the power of the specified electronic controller based on the determined control contents using the power relay.

Detailed studies by the inventors found a case in which power is consumed wastefully in a communication system that includes multiple controllers and that is configured to switch the power of the control devices.

It is an objective of the present disclosure to reduce power consumption in a communication system.

A communication system includes a first controller and a second controller.

The first controller receives an electric power from a power source via a power switch that is configured to switch between a connected state in which a power supply path is electrically connected to the power source and a disconnected state in which the power supply path is electrically disconnected from the power source.

The second controller is connected to the first controller to exchange a communication frame and configured to control the power switch.

The second controller includes a current detection unit, a management frame obtaining unit, a disconnection determination unit, and a power supply disconnection unit.

The current detection unit is configured to repeatedly detect a current value, as a consumed current value, that is consumed by the first controller.

The management frame obtaining unit is configured to obtain a management frame, as a communication frame, that includes activation information related to activation of the first controller.

The disconnection determination unit is configured to determine, based on the consumed current value and the activation information, whether a predetermined disconnection condition is met. The disconnection condition indicates that the first controller keeps consuming a large amount of power but the first controller is in a sleep state.

The power supply disconnection unit is configured to switch the power switch to the disconnected state when the disconnection determination unit determines that the predetermined disconnection condition is met.

The communication system of the present disclosure configured in this manner can interrupt the power supply to the first controller based on the consumed current value and the activation information when the first controller wastes power even though the first controller is in the sleep state. As a result, the communication system of the present disclosure can prevent the first controller from wasting power and reduce power consumption in the communication system.

According to another aspect of the present disclosure, an electronic control device is provided. The electronic control device serves as a second controller of a communication system including a first controller and the second controller. The electronic control device includes a current detection unit, a management frame obtaining unit, a disconnection determination unit, and a power supply disconnection unit.

The electronic control device of the present disclosure is a device used in the communication system of the present disclosure and can achieve the same effects as the communication system of the present disclosure.

(First Embodiment) The first embodiment of the present disclosure will be described below with reference to the drawings. The communication system 1 of the present embodiment is mounted in a vehicle, and includes a master ECU 2, slave ECUs 3, 4, 5, and 6, and a battery 7, as shown in FIG. 1. ECU is an abbreviation for Electronic Control Unit. Hereinafter, the master ECU 2 and the slave ECUs 3 to 6 will be collectively referred to as nodes.

The master ECU 2 and the slave ECUs 3, 4, and 5 are connected to each other via a communication bus 8 to be capable of data communication. The master ECU 2 and the slave ECU 6 are connected to each other via a communication bus 9 to be capable of data communication.

The battery 7 supplies electric power to various parts of the vehicle at a DC battery voltage (for example, 12 V). The master ECU 2 and the slave ECUs 3 to 6 operate by receiving the electric power from the battery 7.

The master ECU 2 includes a control unit 11, CAN communication units 12 and 13, a memory unit 14, and electronic fuses 15, 16, and 17. CAN is an abbreviation for Controller Area Network. CAN is a registered trademark. The communication protocol of the communication system 1 is not limited to CAN.

The control unit 11 is an electronic control device mainly including a microcontroller with a CPU 21, a ROM 22, and a RAM 23. Various functions of the microcontroller are implemented by the CPU 21 executing a program stored in a non-transitory tangible storage medium. In this example, the ROM 22 corresponds to the non-transitory tangible storage medium storing the program. A method corresponding to the program is executed by executing the program. A part or all of the functions to be executed by the CPU 21 may be configured as hardware circuitry by one or multiple ICs or the like. The number of the microcontrollers included in the control unit 11 may be one or more.

The CAN communication unit 12 communicates with the slave ECUs 3, 4, and 5 connected through the communication bus 8 by transmitting and receiving a communication frame based on the CAN communication protocol. The CAN communication unit 13 communicates with the slave ECU 6 connected through the communication bus 9 by transmitting and receiving a communication frame based on the CAN communication protocol. Hereinafter, the CAN communication frame will be referred to as a CAN frame.

The memory unit 14 is a storage device for storing various data. The memory unit 14 stores a management table 25, which will be described later. The management table 25 may be stored in the ROM 22 or the RAM 23.

The electronic fuse 15 is arranged on a power supply path 18 between the battery 7 and the slave ECU 3. The electronic fuse 16 is arranged on a power supply path 19 between the battery 7 and the slave ECU 4. The electronic fuse 17 is arranged on a power supply path 20 between the battery 7 and the slave ECU 5.

Each of the electronic fuses 15 to 17 includes a switching element (for example, a MOSFET) and a control circuit. The control circuits for the electronic fuses 15 to 17 are configured to electrically disconnect the power supply paths 18 to 20 from the battery 7 by turning off the switching elements when the current value flowing through the power supply paths 18 to 20 exceeds a predetermined overcurrent determination value.

The control circuits of the electronic fuses 15 to 17 are configured to electrically connect or disconnect the power supply paths 18 to 20 by turning on or off the switching elements in accordance with a command from the control unit 11. Hereinafter, a state in which the power supply paths 18 to 20 are electrically connected to the battery 7 will also be referred to as an on state, and a state in which the power supply paths 18 to 20 are electrically disconnected from the battery 7 will also be referred to as an off state.

The control circuits of the electronic fuses 15 to 17 are configured to measure the current values flowing through the electronic fuses 15 to 17 and output the measured current values as current value information to the master ECU 2. The current values in the current value information output by the electronic fuses 15, 16, and 17 correspond to the current values consumed by the slave ECUs 3, 4, and 5 (hereinafter, referred to as "consumed current values").

Each of the slave ECUs 3 to 6 includes a control unit 31, a CAN communication unit 32, and a memory unit 33. The control unit 31 is an electronic control device mainly including a microcontroller with a CPU 41, a ROM 42, and a RAM 43. Various functions of the microcontroller are implemented by causing the CPU 41 to execute program codes stored in a non-transitory tangible storage medium. In this example, the ROM 42 corresponds to the non-transitory tangible storage medium that stores a program. In addition, by executing this program, a method corresponding to the program is executed. Note that a part or all of the functions to be executed by the CPU 41 may be configured as hardware circuitry by one or multiple ICs or the like. Alternatively, the number of the microcontrollers constituting the control unit 31 may be one or more.

The CAN communication units 32 of the slave ECUs 3 to 5 communicate with communication devices (that is, the master ECU 2 and the slave ECUs 3 to 5) connected to the communication bus 8 based on a CAN communication protocol.

The CAN communication unit 32 of the slave ECU 6 communicates with a communication device (that is, the master ECU 2) connected to the communication bus 9 based on a CAN communication protocol. The memory unit 33 is a storage device for storing various data.

A CAN frame includes a start-of-frame, an arbitration field, a control field, a data field, a CRC field, an ACK field, and an end-of-frame. The arbitration field consists of an 11-bits or 29-bits identifier (i.e., ID) and a 1-bit RTR.

Here, the 11-bit identifier used in the CAN communication is referred to as CAN ID. The CAN ID is predetermined based on data contents of the CAN frame, the source of the CAN frame, the destination of the CAN frame, and the like.

The data field is a payload including first data, second data, third data, fourth data, fifth data, sixth data, seventh data, and eighth data each of which is 8 bits (that is, one byte).

The communication system 1 forms a partial network, which is an electric power supply control method based on communication control of the CAN protocol standard defined in ISO11898-6. Thus, the communication system 1 selectively causes communication groups including one or more nodes to enter a wake-up state (i.e., an activation state) or a sleep state (i.e., a dormant state). The communication system 1 causes the at least one node belonging to the same communication group all together to enter the wake-up state or the sleep state. Thereby, the communication system 1 achieves low electric power consumption. Waking up of the node means that the node enters a normal operation state in which the functions assigned to the node are available without restriction, and sleep of the node means that the node enters a low power operation state with the limited functions.

The communication system 1 uses an NM frame, which is a CAN frame including activation information for specifying activation groups, when waking up nodes in the sleep state. NM is an abbreviation for Network Management.

The activation information is set as shown in FIG. 2, for example. DLC is an abbreviation for Data Length Code, which is an area that represents the size of a data field in a CAN frame in bytes. That is, the activation information is stored in the data field of the CAN frame. Here, in order to simplify the explanation, a case where the DLC is 1 byte (i.e., 8 bits) is shown. Activation groups are assigned respectively to bits of 8-bit data representing the activation information.

In the activation information set in the NM frame, a bit corresponding to the activation group to be activated is set to 1. Each node stores affiliation information indicating the activation group or groups to which the own node belongs. The affiliation information has the same data length as the activation information, and the assignment of the groups to bits in the affiliation information is also the same as that of the activation information. In the affiliation information, the bit corresponding to the activation group to which the own node belongs is set to 1.

Each node determines whether the communication group to which the own node belongs is a target for activation by comparing the activation information extracted from the NM frame and the affiliation information stored in the own node.

For example, the affiliation information shown in FIG. 2 indicates that the node belongs to the first communication group, the third communication group, and the fifth communication group. The activation information shown in FIG. 2 requests the second communication group, the third communication group, the fourth communication group, and the fifth communication group to be activated. Since both the affiliation information and the activation information include the third communication group and the fifth communication group as shown in FIG. 2, the node determines that the own node is a target for activation as the third communication group and the fifth communication group.

The management table 25 shown in FIG. 1 sets, for each of multiple communication groups, a correspondence between the communication group and at least one node (that is, at least one node to be activated) belonging to the corresponding communication group.

The management table 25 indicates, for example, that the master ECU 2 and the slave ECUs 3 and 4 belong to the first communication group. The management table 25 indicates, for example, that the slave ECUs 3, 4, and 5 belong to the second communication group.

In addition, each of the master ECU 2 and slave ECUs 3 to 6 is configured to, when detecting that a start condition of an event is satisfied, generate and transmit an NM frame including, as the activation information, information indicating a communication group related to the event.

Figure 3:
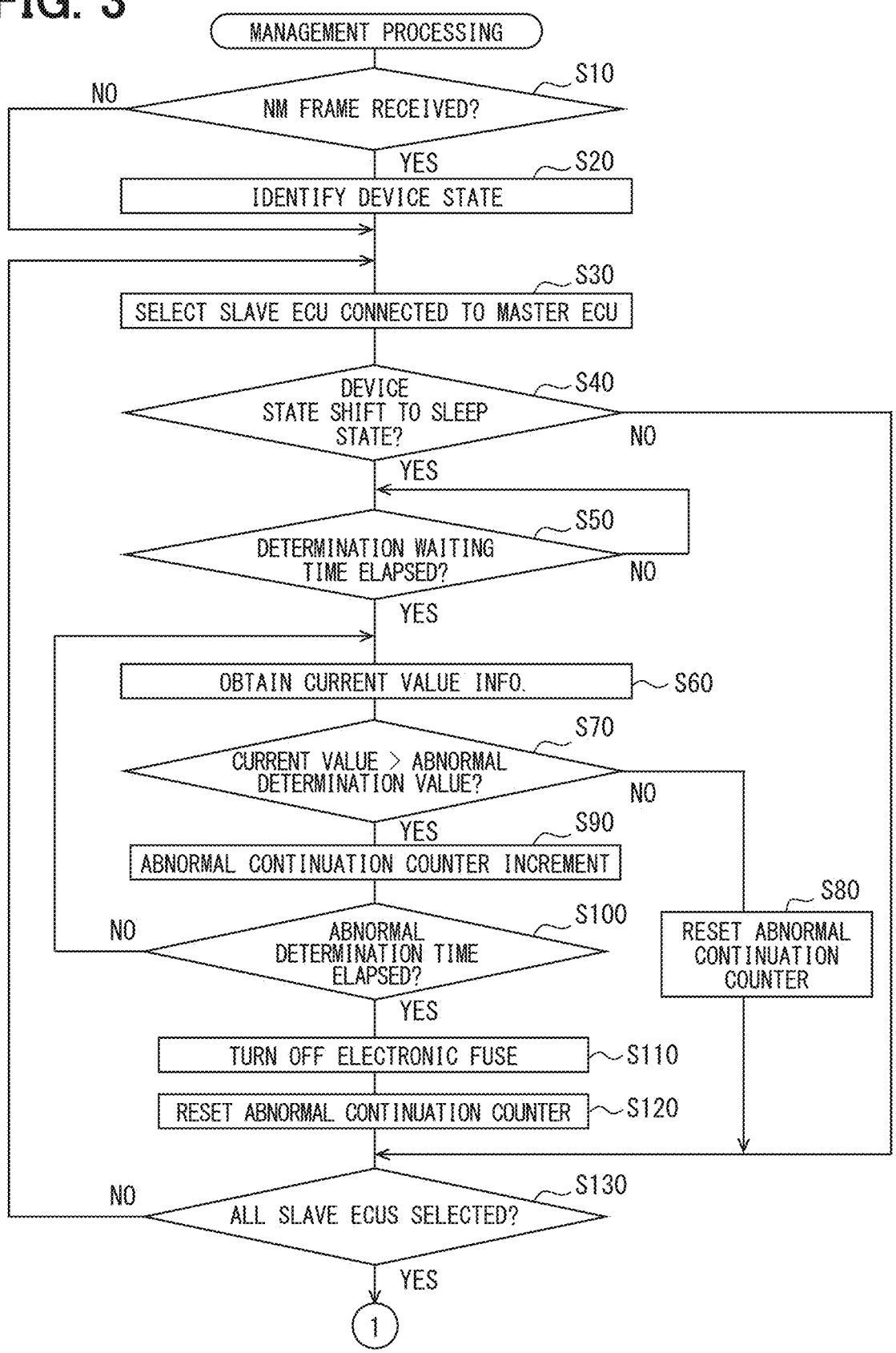
FIG. 3 is a first part of a flowchart of management processing.

Next, the procedure of the management processing executed by the control unit 11 of the master ECU 2 will be described. The management processing is repeatedly executed while the master ECU 2 is operating. When the management processing is executed, the CPU 21 of the control unit 11 determines in S10 whether an NM frame has been received, as shown in FIG. 3. Note that the CPU 21 determines in S10 that the NM frame has been received if the master ECU 2 generates and transmits the NM frame.

When the NM frame has not been received, the CPU 21 moves the management processing to S30. On the other hand, when the NM frame has been received, the CPU 21 determines in S20 the states of the slave ECUs 3, 4, 5 (hereinafter, referred to as a device state) based on the activation information included in the received NM frame, and moves the management processing to S30. The device state is the state of the slave ECUs 3, 4, 5 that is specified based on the activation information included in the received NM frame.

Specifically, the CPU 21 firstly refers to the management table 25 and identifies one or multiple pieces of activation information corresponding to each of the slave ECUs 3, 4, 5.

Next, the CPU 21 determines whether at least one piece of activation information corresponding to each of the slaves ECUs 3, 4, 5 indicates "1".

Here, when at least one piece of activation information indicates "1", the CPU 21 determines that the device state of the corresponding slave ECU is the wake-up state. On the other hand, when all pieces of the activation information indicate "0", the CPU 21 determines that the device state of the corresponding slave ECU is the sleep state. In addition, when the CPU 21 receives multiple NM frames, the CPU 21 determines that the device state of the slave ECU is the sleep state if all of the activation information in the received multiple NM frames corresponding to the slave ECU indicate "0".

When the management processing proceeds to S30, the CPU 21 selects, as a first determination target ECU, a slave ECU that has not been selected in S30 of the currently executed management processing among the slave ECUs connected to the master ECU 2 (i.e., the slave ECUs 3, 4, and 5). For example, when the slave ECU 3 has been already selected among the slave ECUs 3, 4, and 5, the CPU 21 selects the slave ECU 4 as the first determination target ECU.

In S40, the CPU 21 determines whether the first determination target ECU is switched from the wake-up state to the sleep state. Specifically, the CPU 21 determines that the first determination target ECU is switched when the first determination target ECU is currently in the wake-up state and the device state specified in S20 is the sleep state.

Here, when the first determination target ECU is not switched from the wake-up state to the sleep state, the CPU 21 moves the management processing to S130. On the other hand, when the first determination target ECU is switched, the CPU 21 determines in S50 whether a predetermined determination waiting time has elapsed since the CPU 21 determined in S10 that the NM frame has been received.

The determination waiting times are set respectively for the slave ECUs 3, 4, and 5. When the first determination target ECU is currently in the wake-up state and the device state of the first determination target ECU identified in S20 is the sleep state, the determination waiting time is as a sleep transition waiting time that is set to be longer than the time required for the first determination target ECU to enter the sleep state.

In addition, when the first determination target ECU is currently in the sleep state and the device state of the first determination target ECU identified in S20 is the wake-up state, the determination waiting time is as a wake-up transition waiting time that is set to be longer than the time required for the first determination target ECU to enter the wake-up state.

When the determination waiting time has not elapsed, the CPU 21 repeats the processing of S50 and waits until the determination waiting time has elapsed. In addition, if the first determination target ECU requires transition to the wake-up state based on the NM frame received during a period until the determination waiting time has elapsed, the processing of S50 may be interrupted and the procedure may move to S130. This makes it possible to prevent the electronic fuse connected to the first determination target ECU from entering the off state when the first determination target ECU requires transition to the wake-up state based on the NM frame.

When the determination waiting time has elapsed, the CPU 21 obtains in S60 current value information from the electronic fuse connected to the first determination target ECU. For example, when the first determination target ECU is the slave ECU 3, the CPU 21 obtains the current value information from the electronic fuse 15.

In S70, the CPU 21 determines whether the current value indicated by the current value information obtained in S60 is greater than a predetermined abnormality determination value. When the current value is equal to or less than the abnormality determination value, the CPU 21 resets an abnormality continuation counter provided in the RAM 23 in S80 (i.e., the CPU 21 sets the abnormality continuation counter to 0), and moves the management processing to S130.

On the other hand, when the current value is greater than the abnormality determination value, the CPU 21 increments the abnormality continuation counter (i.e., the CPU 21 adds 1 to the abnormality continuation counter) in S90. In step S100, the CPU 21 determines whether an abnormality determination time has elapsed. Specifically, the CPU 21 determines whether the value of the abnormality continuation counter is greater than an abnormality continuation determination value. The abnormality continuation determination value is predetermined such that the abnormality continuation determination value is equivalent to the abnormality determination time.

When the abnormality determination time has not elapsed, the CPU 21 moves the management processing to S60. On the other hand, when the abnormality determination time has elapsed, the CPU 21 turns off the electronic fuse connected to the first determination target ECU in S110.

The CPU 21 resets the abnormality continuation counter in S120, and moves the management processing to S130. In S130, the CPU 21 determines whether all of the slave ECUs connected to the master ECU 2 have been selected in S30. If there is a slave ECU that has not been selected in S30, the CPU 21 moves the management processing to S30.

Figure 4:
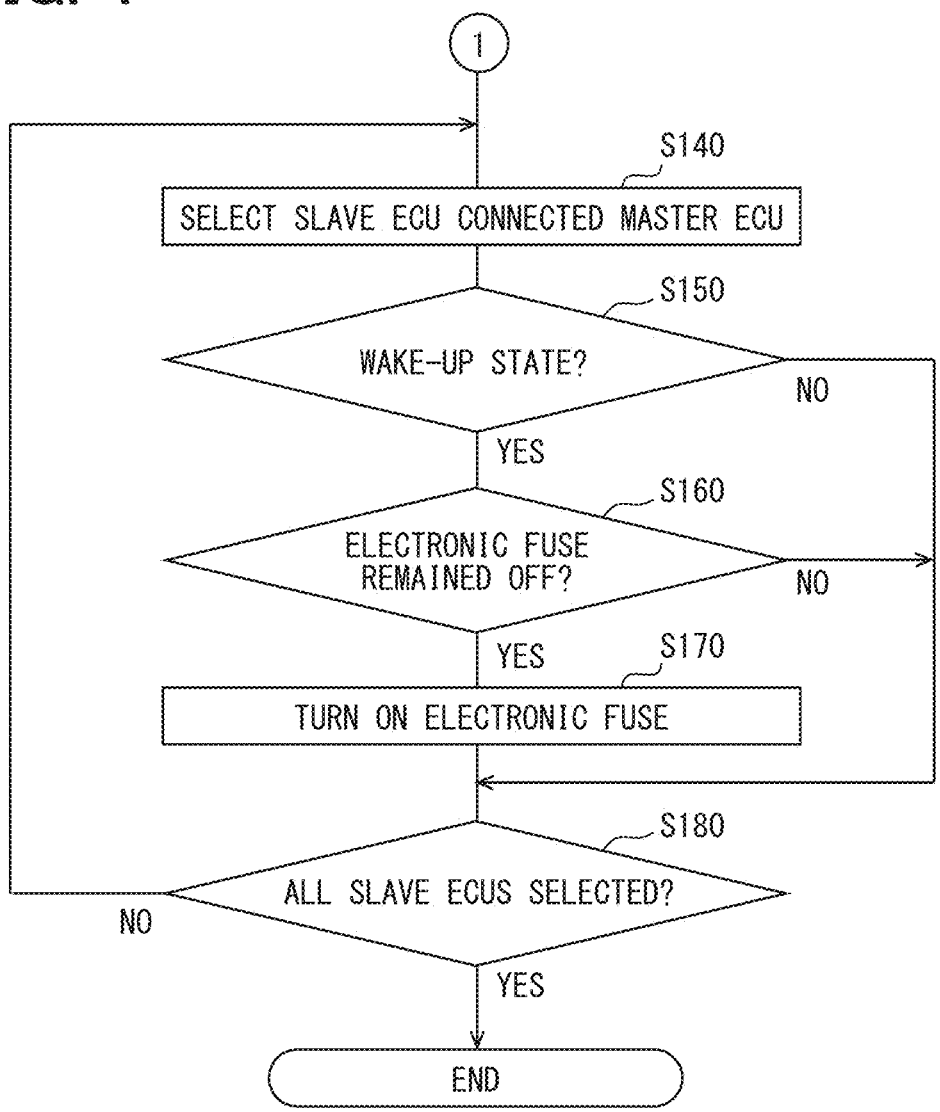
FIG. 4 is a second part of the flowchart of management processing.

On the other hand, when all of the slave ECUs connected to the master ECU 2 have been selected in S30, the CPU 21 selects, as a second determination target ECU, a slave ECU that has not been selected in S140 of the currently executed management processing among the slave ECUs connected to the master ECU 2 (i.e., slave ECUs 3, 4, and 5), as shown in FIG. 4.

In S150, the CPU 21 determines whether the device state of the second determination target ECU is the wake-up state based on the determination result in S20. Here, when the device state of the second determination target ECU is not the wake-up state, the CPU 21 moves the processing to S180.

On the other hand, when the device state of the second determination target ECU is the wake-up state, the CPU 21 determines in S160 whether the electronic fuse connected to the second determination target ECU is in the off state. When the electronic fuse connected to the second determination target ECU is in the on state, the CPU 21 moves the processing to S180.

When the electronic fuse connected to the second determination target ECU is in the off state, the CPU 21 turns on the electronic fuse connected to the second determination target ECU in S170 and moves the processing to S180.

In S180, the CPU 21 determines whether all of the slave ECUs connected to the master ECU 2 have been selected in S140. If there is a slave ECU that has not been selected in S140, the CPU 21 moves the processing to S140. If all of the slave ECUs connected to the master ECU 2 have been selected in S140, the CPU 21 ends the management processing.

The communication system 1 configured in this manner includes the slave ECU 3 and the master ECU 2. The slave ECU 3 receives electric power from the battery 7 via the electronic fuse 15 that is configured to switch between a connected state in which the power supply path is electrically connected to the battery 7 and a disconnected state in which the power supply path is electrically disconnected from the battery 7.

The master ECU 2 is connected to the slave ECU 3 for data communication, and is configured to exchange CAN frame and control the operation of the electronic fuse 15. The master ECU 2 includes the control unit 11 and the CAN communication unit 12.

The control unit 11 is configured to repeatedly detect a current value consumed by the slave ECU 3 as a consumed current value. The CAN communication unit 12 is configured to obtain an NM frame, which is a CAN frame including activation information related to the activation of the slave ECU 3. The activation information in this embodiment is information indicating whether to activate the slave ECU 3.

The control unit 11 is configured to determine, based on the consumed current value and the activation information, whether the predetermined disconnection condition has been met. The disconnection condition indicates that current consumption in the slave ECU 3 remains high even though the slave ECU 3 is in the sleep state. The disconnection condition in this embodiment is that the consumed current value has exceeded the predetermined abnormality determination value for the predetermined abnormality determination time.

The control unit 11 is configured to electrically disconnect the electronic fuse 15 when determining that the disconnection condition is met. Such communication system 1 can interrupt power supply to the slave ECU 3 based on the consumed current value and the activation information when the slave ECU 3 wastes power even though the slave ECU 3 is in the sleep state. As a result, the communication system 1 can prevent the slave ECU 3 from wasting power, thereby reducing power consumption in the communication system 1.

In addition, the control unit 11 is configured to electrically connect the electronic fuse 15 when the activation information in the NM frame that is obtained after the electronic fuse 15 was electrically disconnected requests the slave ECU 3 to be activated. As a result, when the slave ECU 3 is ready to start, the communication system 1 can activate the slave ECU 3 by supplying power to the slave ECU 3. As a result, the communication system 1 can prevent situations where the slave ECU 3 cannot be utilized in the communication system 1 despite being in an activatable state, thereby improving the operating rate of the slave ECU 3.

The control unit 11 is further configured to detect the consumed current value by obtaining, from the electronic fuse 15, current value information indicating the current value flowing through the electronic fuse 15. The communication system 1 can detect the consumed current value with the current detection function of the electronic fuse 15, thereby simplifying the configuration of the communication system 1.

In the embodiment described above, the electronic fuse 15 corresponds to the power switch, the battery 7 corresponds to the power source, the slave ECU corresponds to the first controller, the CAN frame corresponds to the communication frame, and the master ECU 2 corresponds to the second controller and the electronic control device.

Further, the process of S60 corresponds to the process performed by the current detection unit, the CAN communication unit 12 corresponds to the management frame obtaining unit, the process from S70 through S100 corresponds to the process performed by the disconnection determination unit, the process of S110 corresponds to the process performed by the power supply disconnection unit, the process from S150 through S170 corresponds to the process performed by the power supply connection unit.

(Second Embodiment) Hereinafter, a second embodiment of the present disclosure will be described with reference to the drawings. In the second embodiment, portions different from the first embodiment will be described. Common configurations are denoted by the same reference numerals.

Figure 5:
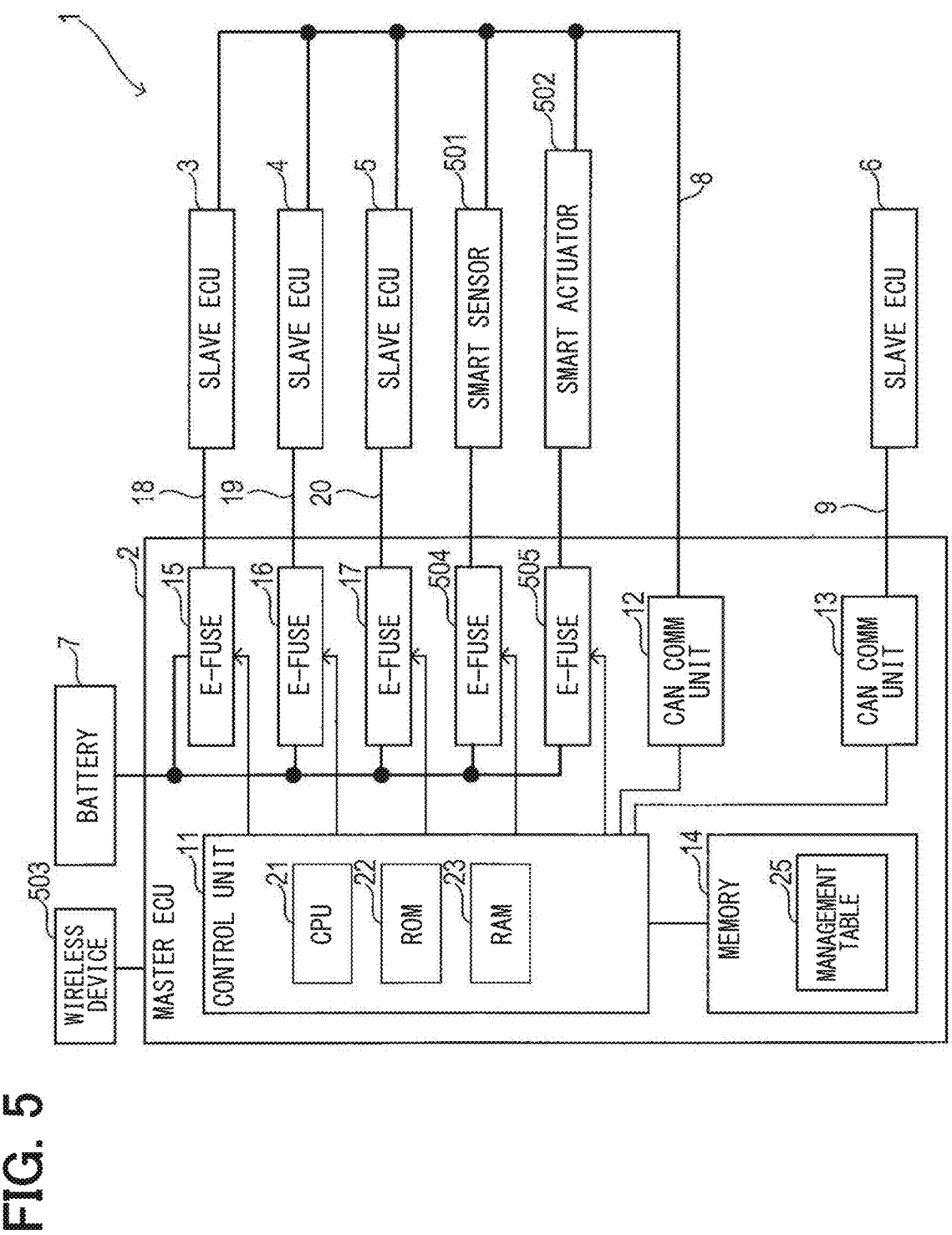
FIG. 5 is a block diagram illustrating the configuration of a communication system according to a second embodiment.

As shown in FIG. 5, the communication system 1 of the second embodiment differs from the first embodiment in that a smart sensor 501, a smart actuator 502, a wireless device 503, and electronic fuses 504 and 505 are added.

The smart sensor 501 is a sensor equipped with a communication function. The smart sensor 501 is connected to the communication bus 8.

The smart actuator 502 is an actuator equipped with a communication function. The smart actuator 502 is connected to the communication bus 8.

The wireless device 503 is a wireless communication device for performing wireless communication with an external communication device installed outside the vehicle. The wireless device 503 is, for example, a DCM. DCM stands for Data Communication Module.

The electronic fuse 504 is disposed on the power supply path between the battery 7 and the smart sensor 501. The electronic fuse 505 is disposed on the power supply path between the battery 7 and the smart actuator 502.

Each of the electronic fuses 504 and 505 is configured to switch, in response to an instruction from the control unit 11, between the connected state in which the power supply path is electrically connected to the battery 7 and the disconnected state in which the power supply path is electrically disconnected from the battery 7.

Hereinafter, the master ECU 2, the slave ECUs 3 to 6, the smart sensor 501 and the smart actuator 502 will be collectively referred to as nodes.

(Prerequisite) The master ECU 2 and the slave ECU 6 are always supplied with the electric power by the battery 7 without passing through a relay, and can independently switch between the wake-up state and the sleep state by themselves. Hereinafter, the master ECU 2 and the slave ECU 6 are also referred to as NM-equipped nodes. An NM-equipped node is a node having a function of generating an NM frame.

The slave ECUs 3, 4, 5, the smart sensor 501, and the smart actuator 502 are supplied with the electric power through an electronic fuse, and cannot independently switch to the wake-up state or the sleep state by themselves. That is, the slave ECUs 3, 4, 5, the smart sensor 501, and the smart actuator 502 enter the wake-up state when the corresponding electronic fuse is turned on, and enter the sleep state when the corresponding electronic fuse is turned off. Hereinafter, the slave ECUs 3, 4, 5, the smart sensor 501, and the smart actuator 502 are also referred to as NM-non-equipped nodes. The NM-non-equipped node is a node that does not have the functions to generate and interpret a NM frame.

The NM-non-equipped node includes at least one of an actuator and a sensor in addition to an ECU having a control function.

The power supply paths to the NM-non-equipped nodes are connected to the electronic fuses 15, 16, 17, 504, and 505 of the master ECU 2, respectively.

The NM-non-equipped nodes and the electronic fuses may be connected one-to-one, or multiple NM-non-equipped nodes belonging to the same cluster (i.e., a group that is activated simultaneously) may be connected to a single electronic fuse.

The master ECU 2 and the NM-equipped node have communication function and can exchange NM frames.

The NM-equipped node determines whether own node is in the wake-up state or the sleep state based on an NM frame transmitted and received via the communication bus.

The master ECU 2 turns on or off the electronic fuses 15, 16, 17, 504, and 505 to which the NM-non-equipped nodes are connected, based on the NM frame transmitted and received via the communication bus.

The payload (i.e., data area) of an NM frame transmitted and received by the master ECU 2 and the NM-equipped node stores one or more bits of information indicating which cluster to activate.

The vehicle includes at least one master ECU (i.e., ECU with built-in electronic fuses).

As shown in FIG. 6, at least one node belonging to each cluster is determined in advance by the system developer. Although it is possible to assign a cluster to each node, multiple nodes can be assigned to one cluster. If the bit corresponding to each cluster is active (i.e., "bit"=1), the cluster wakes up. From the view of the master ECU, waking up indicates turning on the electronic fuse.

(First activation example) The first activation example is an operation example in which a malfunction diagnosis of the slave ECU 3 is performed based on a request from the cloud.

First, the wireless device 503 receives a connection request from the base station (i.e., the cloud).

Next, when the wireless device 503 determines that the connection request is proper, the wireless device 503 notifies the master ECU 2 of the event received from the cloud.

Next, the master ECU 2 determines a service defined as "malfunction diagnosis of the slave ECU 3" based on the event, and generates an NM frame in which the bit of the third cluster to which only the slave ECU 3 belongs is active in order to activate the slave ECU 3.

Next, the master ECU 2 transmits the generated NM frame onto the communication buses 8 and 9.

Since there is no NM-equipped node belonging to the third cluster on the communication buses 8 and 9, there is no change in the devices on the communication buses.

Next, the master ECU 2 executes processing based on the NM frame in the control unit 11, assuming that the master ECU has received an NM frame in which the bit of the third cluster is active at the same time as the above.

Next, the control unit 11 of the master ECU 2 determines a wake-up instruction to the third cluster based on the NM frame. Since the third cluster includes the electronic fuse 15, the control unit 11 turns on the electronic fuse 15.

When the electronic fuse 15 is in the on state, the electric power is supplied to the downstream slave ECU 3 and the slave ECU 3 is activated.

The master ECU 2 waits for the slave ECU 3 to be activated, requests the slave ECU 3 for a diagnosis code, and transmits a response result from the slave ECU 3 to the base station via the wireless device 503.

(Second activation example) The second activation example is an operation example in which a malfunction diagnosis of the slave ECU 6 is performed based on a request from the cloud.

First, the wireless device 503 receives a connection request from the base station (i.e., the cloud).

Next, when the wireless device 503 determines that the connection request is proper, the wireless device 503 notifies the master ECU 2 of the event received from the cloud.

Next, the master ECU 2 determines a service defined as "malfunction diagnosis of the slave ECU 6" based on the event, and generates an NM frame in which the bit of the fourth cluster to which only the slave ECU 6 belongs is active in order to activate the slave ECU 6.

Next, the master ECU 2 transmits the generated NM frame onto the communication buses 8 and 9.

Since the slave ECU 6 is disposed on the communication bus 6 as a node belonging to the fourth cluster, the slave ECU 6 wakes up.

Next, the master ECU 2 executes processing based on the NM frame in the control unit 11, assuming that the master ECU 2 has received an NM frame in which the bit of the fourth cluster is active at the same time as transmitting the NM frame.

Next, even if the control unit 11 of the master ECU 2 determines to issue a wake-up instruction to the fourth cluster based on the NM frame, the fourth cluster does not include the corresponding electronic fuse, so the control unit 11 ignores the instruction.

When the slave ECU 6 is activated, the master ECU 2 requests the slave ECU 6 for a diagnostic code via the communication bus 9, and transmits a response result from the slave ECU 6 to the base station via the wireless device 503.

(Third activation example) The third activation example is an operation example in which remote air conditioning is activated using a smartphone by a user.

First, the user issues an instruction to turn on the in-vehicle air conditioner via the smartphone.

When the wireless device 503 receives an instruction signal from the smartphone and determines that the instruction signal is proper, the wireless device 503 transmits the event (i.e., the instruction signal) received from the cloud to the master ECU 2.

The master ECU 2 determines the "air conditioning service" based on the event, and generates an NM frame in which the second cluster is activated as the air conditioning cluster.

If it is desired to maintain an active state in which the master ECU 2 periodically transmits the generated NM frame to the communication buses 8 and 9 until an instruction to stop the air conditioner is issued, the master ECU 2 needs to continue transmitting the NM frame periodically. At the same time, the control unit 11 of the master ECU 2 executes a process based on the NM frame.

When an NM frame in which the second cluster is active occurs on the communication bus 9, the slave ECU 6 (i.e., the air conditioner ECU) belonging to the second cluster receives the NM frame and wakes up in accordance with the received NM frame.

When the control unit 11 of the master ECU 2 detects that the second cluster is active, the master ECU 2 turns on the electronic fuses 504 and 505 that belong to the second cluster.

When the electronic fuse 504 and the electronic fuse 505 are in the on state, the electric power is supplied to the smart sensor 501 (i.e., the temperature sensor) and the smart actuator 502 (i.e., the compressor).

As a result of the above, the electric power is supplied to the air conditioner ECU, the smart sensor 501, and the smart actuator 502, thereby turning on the in-vehicle air conditioner.

When the user issues an instruction to turn off the in-vehicle air conditioner from the smartphone, the master ECU 2 stops the periodic transmission of the NM frame.

When the NM frame is interrupted, the slave ECU 6 transitions to the sleep state, and the master ECU 2 turns off the electronic fuses 504 and 505. Thus, the in-vehicle air conditioner stops operating.

(Fourth activation example) The fourth activation example is an operation example in which the slave ECU 6 activates the in-vehicle air conditioner.

The slave ECU 6 is continuously supplied with the electric power even when the vehicle is stopped. Thus, the slave ECU 6 can wake up by detecting signals indicating that an activation switch connected to the slave ECU 6 is turned on even in the sleep state.

When the slave ECU 6 in the wake-up state confirms an input to activate the in-vehicle air conditioner, the slave ECU 6 generates an NM frame in which the bit corresponding to the second cluster is turned on.

The slave ECU 6 transmits the generated NM frame via the CAN communication unit 32. When the master ECU 2 receives this NM frame, the master ECU 2 turns on the electronic fuses 504 and 505 that belong to the second cluster.

When the activation switch of the in-vehicle air conditioner is turned off, the slave ECU 6 stops transmitting the NM frame and transitions to the sleep state after a while.

When the NM frame is interrupted, the master ECU 2 turns off the electronic fuses 504 and 505 after a while and ends the control.

When the master ECU 2 determines that it is necessary to continue the control even after the transmission of the NM frame has stopped, the master ECU 2 transmits an NM frame in which the bit corresponding to the second cluster is turned on. Thus, the slave ECU 6 and the electronic fuses 504 and 505 can maintain the activation state until the transmission of the NM frame generated by the master ECU 2 stops.

(Third Embodiment) Hereinafter, a third embodiment of the present disclosure will be described with reference to the drawings. In the third embodiment, portions different from those of the first embodiment will be described.

Figure 7:
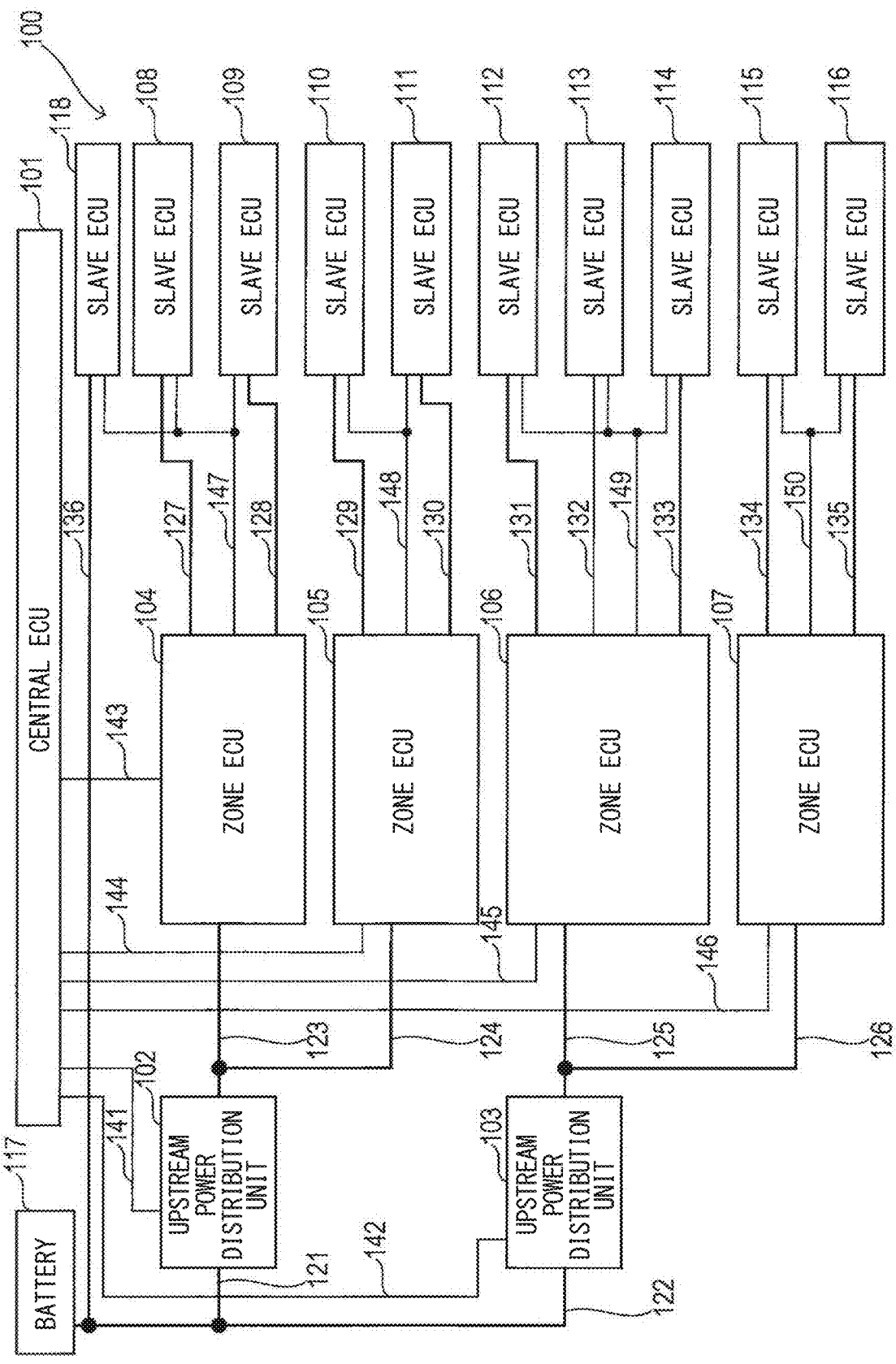
FIG. 7 is a block diagram illustrating the configuration of a communication system according to a third embodiment.

The communication system 100 of the third embodiment is mounted on a vehicle and, as shown in FIG. 7, includes a central ECU 101, upstream power distribution units 102, 103, zone ECUs 104, 105, 106, 107, slave ECUs 108, 109, 110, 111, 112, 113, 114, 115, 116, a battery 117, and a slave ECU 118. In the following description, the central ECU 101, the zone ECUs 104 to 107, and the slave ECUs 108 to 116 and 118 are collectively referred to as nodes. Here, the zone ECU may be an ECU that bundles slave ECUs located in a predetermined area within the vehicle, or an ECU that bundles slave ECUs that belong to a predetermined domain.

The battery 117 supplies electric power to various parts of the vehicle at a DC battery voltage (for example, 12V). The central ECU 101, the upstream power distribution units 102 and 103, the zone ECUs 104 to 107, and the slave ECUs 108 to 116 and 118 operate with the electric power from the battery 117.

The upstream power distribution unit 102 receives the electric power from the battery 117 via a power supply path 121 between the battery 117 and the upstream power distribution unit 102.

The upstream power distribution unit 103 receives the electric power from the battery 117 via a power supply path 122 between the battery 117 and the upstream power distribution unit 103.

The zone ECUs 104 and 105 receive the electric power from the battery 117 via power supply paths 123 and 124 between the upstream power distribution unit 102 and the zone ECUs 104 and 105, respectively.

The zone ECUs 106 and 107 receive the electric power from the battery 117 via the power supply paths 125 and 126 between the upstream power distribution unit 103 and the zone ECUs 106 and 107, respectively.

The slave ECUs 108 and 109 receive the electric power from the battery 117 via the power supply paths 127 and 128 between the zone ECU 104 and the slave ECUs 108 and 109, respectively.

The slave ECUs 110 and 111 receive the electric power from the battery 117 via the power supply paths 129 and 130 between the zone ECU 105 and the slave ECUs 110 and 111, respectively.

The slave ECUs 112, 113 and 114 receive the electric power from the battery 117 via the power supply paths 131, 132 and 133 between the zone ECU 106 and the slave ECUs 112, 113 and 114, respectively.

The slave ECUs 115 and 116 receive the electric power from the battery 117 via the power supply paths 134 and 135 between the zone ECU 107 and the slave ECUs 115 and 116, respectively.

The slave ECU 118 receives the electric power from the battery 117 via a power supply path 136.

The central ECU 101 and the upstream power distribution unit 102 are connected to each other via a communication line 141 to exchange data with each other.

The central ECU 101 and the upstream power distribution unit 103 are connected to each other via a communication line 142 to exchange data with each other.

The central ECU 101 and each of the zone ECUs 104, 105, 106, and 107 are connected to each other via corresponding communication line 143, 144, 145, and 146 to exchange data with each other.

The zone ECU 104 and the slave ECUs 108, 109 and 118 are connected to each other via a communication bus 147 to exchange data.

The zone ECU 105 and the slave ECUs 110, 111 are connected to each other via a communication bus 148 to exchange data.

The zone ECU 106 and the slave ECUs 112, 113 and 114 are connected to each other via a communication bus 149 to exchange data.

The zone ECU 107 and the slave ECUs 115, 116 are connected to each other via a communication bus 150 to exchange data.

Figure 8:
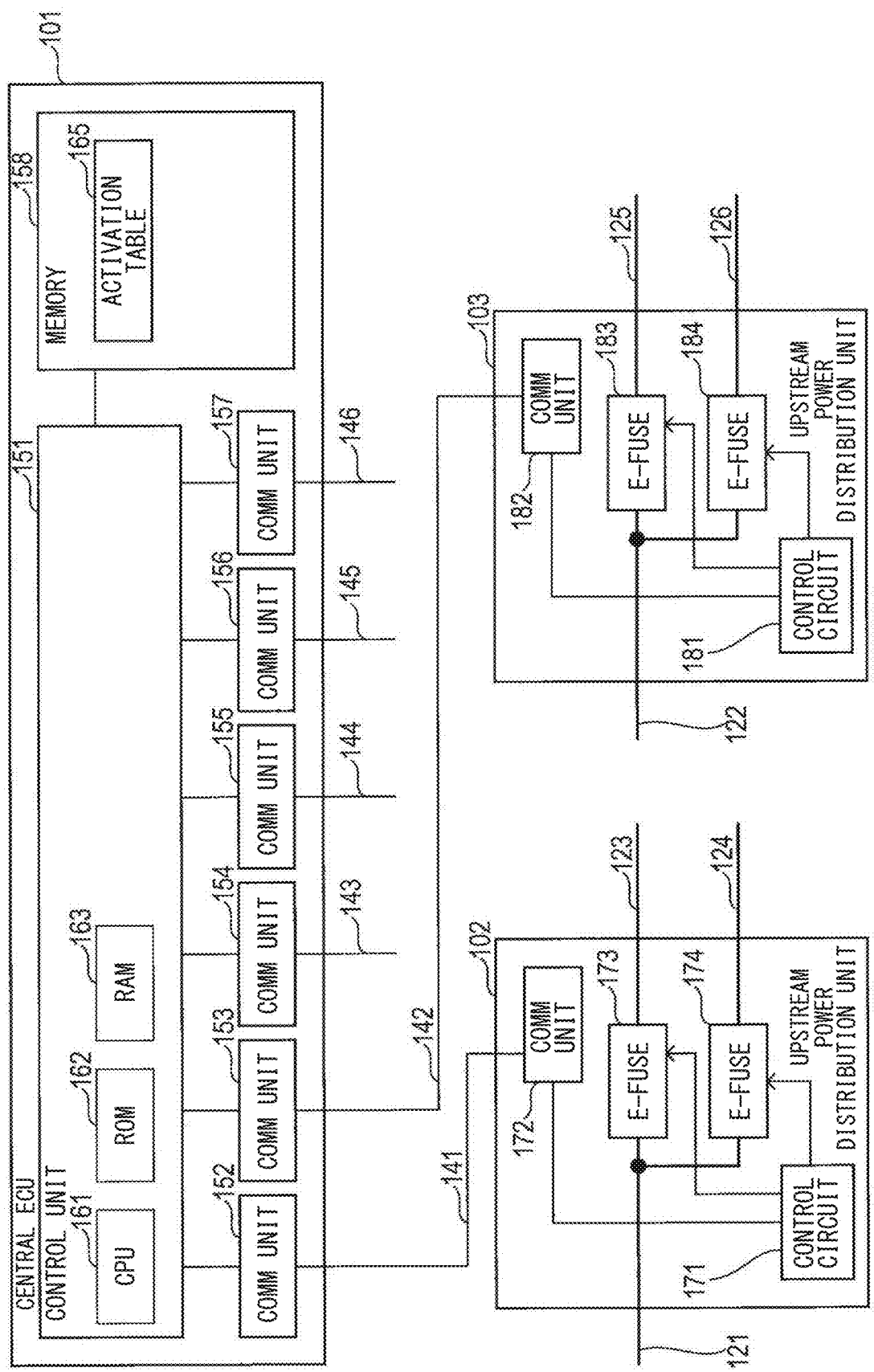
FIG. 8 is a block diagram showing the configuration of a central ECU and an upstream electric power distribution unit according to the third embodiment.

As shown in FIG. 8, the central ECU 101 includes a control unit 151, communication units 152, 153, 154, 155, 156, and 157, and a memory unit 158.

The control unit 151 is an electronic control device mainly including a microcontroller with a CPU 161, a ROM 162, a RAM 163, and the like. Various functions of the microcontroller are implemented by the CPU 161 executing programs stored in a non-transitory tangible storage medium. In this example, the ROM 162 corresponds to the non-transitory tangible storage medium in which the programs are stored. A method corresponding to the program is executed by executing the program. Here, a part or all of the functions to be executed by the CPU 161 may be configured as hardware circuitry by one or multiple ICs or the like. Alternatively, the number of the microcontrollers constituting the control unit 151 may be one or more.

The communication unit 152 communicates with the upstream power distribution unit 102 connected to the communication line 141 by exchanging communication frames based on, for example, the Ethernet communication protocol. Ethernet is a registered trademark.

The communication unit 153 communicates with the upstream power distribution unit 103 connected to the communication line 142 by exchanging communication frames based on, for example, the Ethernet communication protocol.

The communication unit 154 communicates with the zone ECU 104 connected to the communication line 143 by transmitting and receiving communication frames based on, for example, the Ethernet communication protocol.

The communication unit 155 communicates with the zone ECU 105 connected to the communication line 144 by transmitting and receiving communication frames based on, for example, the Ethernet communication protocol.

The communication unit 156 communicates with the zone ECU 106 connected to the communication line 145 by transmitting and receiving communication frames based on, for example, the Ethernet communication protocol.

The communication unit 157 communicates with the zone ECU 107 connected to the communication line 145 by transmitting and receiving communication frames based on, for example, the Ethernet communication protocol.

The memory unit 158 is a storage device for storing various data. The memory unit 158 stores an activation table 165 described later.

The upstream power distribution unit 102 includes a control circuit 171, a communication unit 172, and electronic fuses 173 and 174.

The control circuit 171 performs control to switch the electronic fuses 173 and 174 between the on state and the off state based on an instruction acquired from the central ECU 101 via the communication unit 172.

The communication unit 172 communicates with the central ECU 101 connected to the communication line 141 by transmitting and receiving communication frames based on, for example, the Ethernet communication protocol.

The electronic fuse 173 is disposed between the power supply path 121 and the power supply path 123. The electronic fuse 174 is disposed between the power supply path 121 and the power supply path 124.

The upstream power distribution unit 103 includes a control circuit 181, a communication unit 182, and electronic fuses 183 and 184.

The control circuit 181 performs control to switch the electronic fuses 183 and 184 between the on state and the off state based on an instruction acquired from the central ECU 101 via the communication unit 182.

The communication unit 182 communicates with the central ECU 101 connected to the communication line 142 by transmitting and receiving communication frames based on, for example, the Ethernet communication protocol.

The electronic fuse 183 is disposed between the power supply path 122 and the power supply path 125. The electronic fuse 184 is disposed between the power supply path 122 and the power supply path 126.

Figure 9:
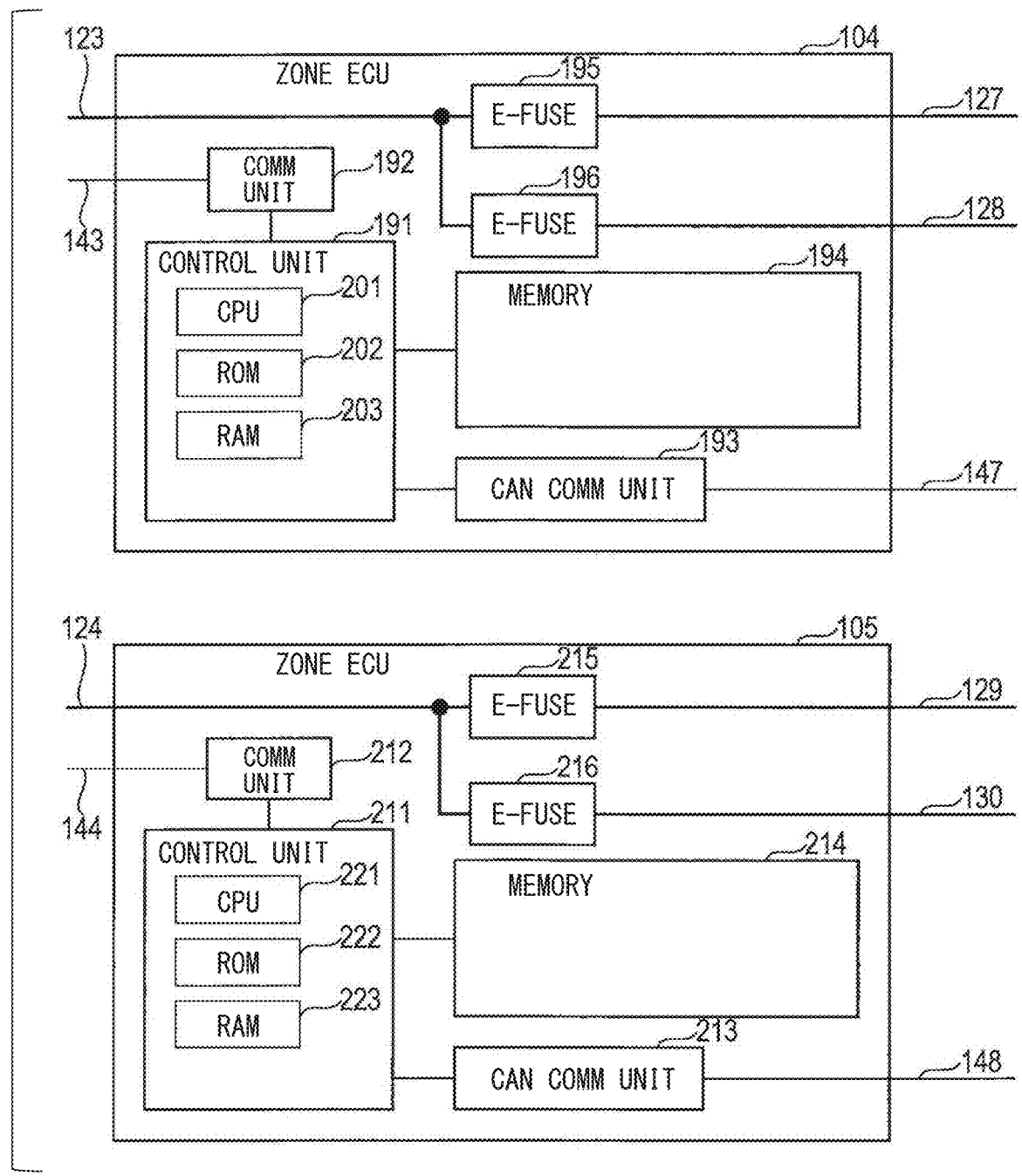
FIG. 9 is a first block diagram illustrating the configuration of a zone ECU according to the third embodiment.

As shown in FIG. 9, the zone ECU 104 includes a control unit 191, a communication unit 192, a CAN communication unit 193, a memory unit 194, and electronic fuses 195 and 196.

The control unit 191 is an electronic control device mainly including a microcontroller with a CPU 201, a ROM 202, a RAM 203, and the like. Various functions of the microcontroller are implemented by the CPU 201 executing programs stored in a non-transitory tangible storage medium. In this example, the ROM 202 corresponds to the non-transitory tangible storage medium in which the programs are stored. A method corresponding to the program is executed by executing the program. Here, a part or all of the functions to be executed by the CPU 201 may be configured as hardware circuitry by one or multiple ICs or the like. Alternatively, the number of the microcontrollers constituting the control unit 191 may be one or more.

The communication unit 192 communicates with the central ECU 101 connected to the communication line 143 by transmitting and receiving communication frames based on, for example, the Ethernet communication protocol.

The CAN communication unit 193 communicates with the slave ECUs 108 and 109 connected to the communication bus 147 by transmitting and receiving a communication frame based on the CAN communication protocol.

The memory unit 194 is a storage device for storing various data.

The electronic fuse 195 is disposed between the power supply path 123 and the power supply path 127. The electronic fuse 196 is disposed between the power supply path 123 and the power supply path 128.

The zone ECU 105 includes a control unit 211, a communication unit 212, a CAN communication unit 213, a memory unit 214, and electronic fuses 215 and 216.

The control unit 211 is an electronic control device mainly including a microcontroller with a CPU 221, a ROM 222, a RAM 223, and the like. Various functions of the microcontroller are implemented by the CPU 221 executing programs stored in a non-transitory tangible storage medium. In this example, the ROM 222 corresponds to the non-transitory tangible storage medium storing programs. A method corresponding to the program is executed by executing the program. Here, a part or all of the functions to be executed by the CPU 221 may be configured as hardware circuitry by one or multiple ICs or the like. Alternatively, the number of the microcontrollers constituting the control unit 211 may be one or more.

The communication unit 212 communicates with the central ECU 101 connected to the communication line 144 by transmitting and receiving communication frames based on, for example, the Ethernet communication protocol.

The CAN communication unit 213 communicates with the slave ECUs 110 and 111 connected to the communication bus 148 by transmitting and receiving a communication frame based on the CAN communication protocol.

The memory unit 214 is a storage device for storing various data.

The electronic fuse 215 is disposed between the power supply path 124 and the power supply path 129. The electronic fuse 216 is disposed between the power supply path 124 and the power supply path 130.

Figure 10:
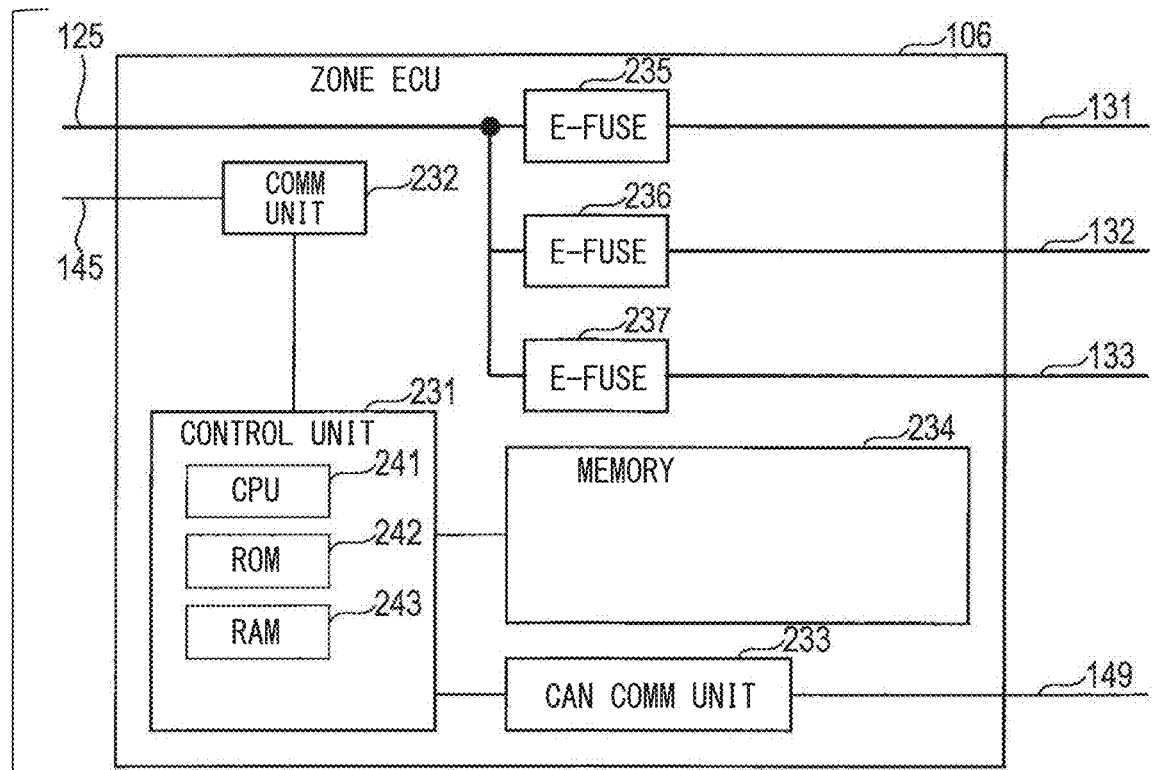
FIG. 10 is a second block diagram illustrating the configuration of the zone ECU according to the third embodiment.
Figure 10:
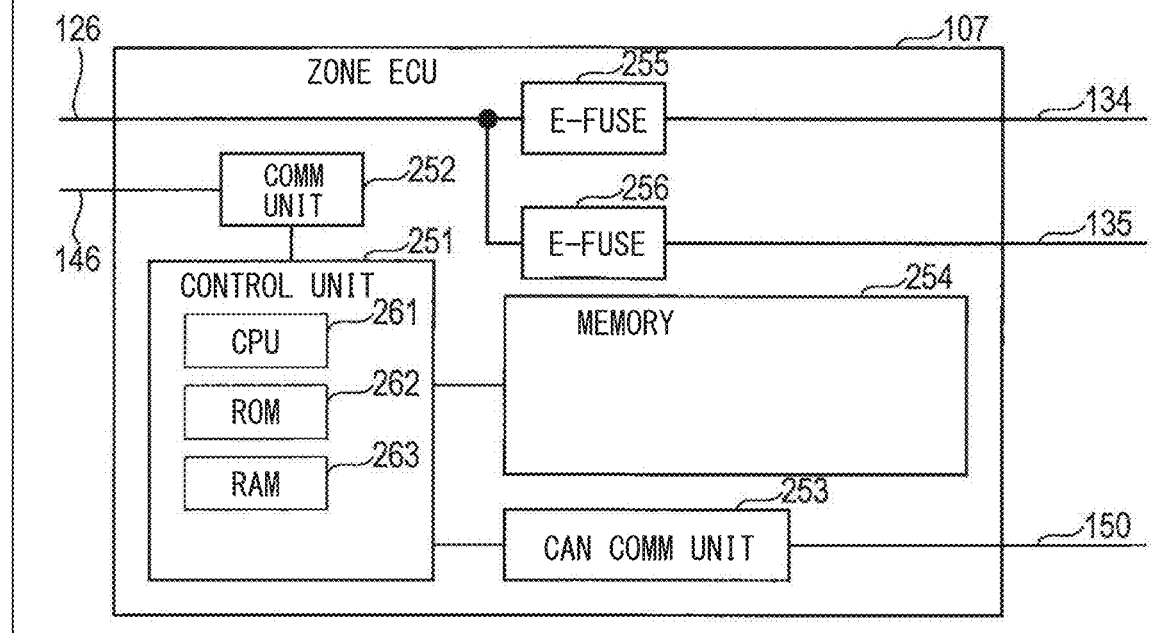

As shown in FIG. 10, the zone ECU 106 includes a control unit 231, a communication unit 232, a CAN communication unit 233, a memory unit 234, and electronic fuses 235, 236 and 237.

The control unit 231 is an electronic control device mainly including a microcontroller with a CPU 241, a ROM 242, a RAM 243, and the like. Various functions of the microcontroller are implemented by the CPU 241 executing programs stored in a non-transitory tangible storage medium. In this example, the ROM 242 corresponds to the non-transitory tangible storage medium in which the programs are stored. A method corresponding to the program is executed by executing the program. Here, a part or all of the functions to be executed by the CPU 241 may be configured as hardware circuitry by one or multiple ICs or the like. Alternatively, the number of the microcontrollers constituting the control unit 231 may be one or more.

The communication unit 232 communicates with the central ECU 101 connected to the communication line 145 by transmitting and receiving communication frames based on, for example, the Ethernet communication protocol.

The CAN communication unit 233 communicates with the slave ECUs 112, 113 and 114 connected to the communication bus 149 by transmitting and receiving a communication frame based on the CAN communication protocol.

The memory unit 234 is a storage device for storing various data.

The electronic fuse 235 is disposed between the power supply path 125 and the power supply path 131. The electronic fuse 236 is disposed between the power supply path 125 and the power supply path 132. The electronic fuse 237 is disposed between the power supply path 125 and the power supply path 133.

The zone ECU 107 includes a control unit 251, a communication unit 252, a CAN communication unit 253, a memory unit 254, and electronic fuses 255 and 256.

The control unit 251 is an electronic control device mainly including a microcontroller with a CPU 261, a ROM 262, a RAM 263, and the like. Various functions of the microcontroller are implemented by the CPU 261 executing programs stored in a non-transitory tangible storage medium. In this example, the ROM 262 corresponds to the non-transitory tangible storage medium in which the programs are stored. A method corresponding to the program is executed by executing the program. Here, a part or all of the functions to be executed by the CPU 261 may be configured as hardware circuitry by one or multiple ICs or the like. Alternatively, the number of the microcontrollers constituting the control unit 251 may be one or more.

The communication unit 252 communicates with the central ECU 101 connected to the communication line 146 by exchanging communication frames based on, for example, the Ethernet communication protocol.

The CAN communication unit 253 communicates with the slave ECUs 115 and 116 connected to the communication bus 150 by exchanging communication frames based on the CAN communication protocol.

The memory unit 254 is a storage device for storing various data.

The electronic fuse 255 is disposed between the power supply path 126 and the power supply path 134. The electronic fuse 256 is disposed between the power supply path 126 and the power supply path 135.

Figure 11:
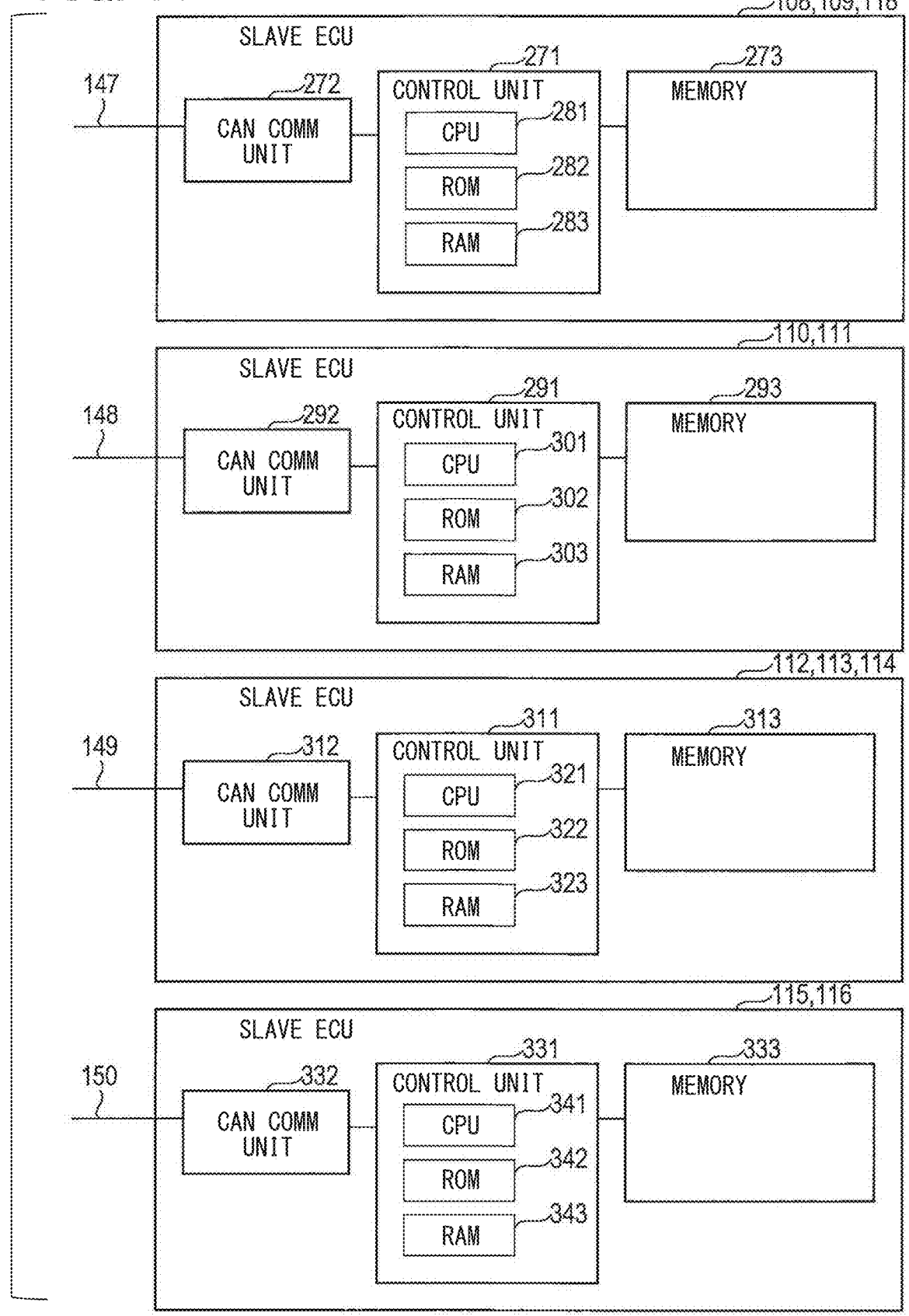
FIG. 11 is a block diagram illustrating a configuration of a slave ECU according to the third embodiment.

As shown in FIG. 11, each of the slave ECUs 108, 109, and 118 includes a control unit 271, a CAN communication unit 272, and a memory unit 273.

The control unit 271 is an electronic control device mainly including a microcontroller with a CPU 281, a ROM 282, a RAM 283, and the like. Various functions of the microcontroller are implemented by the CPU 281 executing programs stored in a non-transitory tangible storage medium. In this example, the ROM 282 corresponds to the non-transitory tangible storage medium in which the programs are stored. A method corresponding to the program is executed by executing the program. Here, a part or all of the functions to be executed by the CPU 281 may be configured as hardware circuitry by one or multiple ICs or the like. Alternatively, the number of the microcontrollers constituting the control unit 271 may be one or more.

The CAN communication unit 272 communicates with the zone ECU 104 connected to the communication bus 147 based on the CAN communication protocol.

The memory unit 273 is a storage device for storing various data.

Each of the slave ECUs 110 and 111 includes a control unit 291, a CAN communication unit 292, and a memory unit 293.

The control unit 291 is an electronic control device mainly including a microcontroller with a CPU 301, a ROM 302, a RAM 303, and the like. Various functions of the microcontroller are implemented by the CPU 301 executing programs stored in a non-transitory tangible storage medium. In this example, the ROM 302 corresponds to the non-transitory tangible storage medium in which the programs are stored. A method corresponding to the program is executed by executing the program. Here, a part or all of the functions to be executed by the CPU 301 may be configured as hardware circuitry by one or multiple ICs or the like. Alternatively, the number of the microcontrollers constituting the control unit 291 may be one or more.

The CAN communication unit 292 communicates with the zone ECU 105 connected to the communication bus 148 based on the CAN communication protocol.

The memory unit 293 is a storage device for storing various data.

Each of the slave ECUs 112, 113 and 114 includes the control unit 311, the CAN communication unit 312, and the memory unit 313.

The control unit 311 is an electronic control device mainly including a microcontroller with a CPU 321, a ROM 322, a RAM 323, and the like. Various functions of the microcontroller are implemented by the CPU 321 executing programs stored in a non-transitory tangible storage medium. In this example, the ROM 322 corresponds to the non-transitory tangible storage medium in which the programs are stored. A method corresponding to the program is executed by executing the program. Here, a part or all of the functions to be executed by the CPU 321 may be configured as hardware circuitry by one or multiple ICs or the like. Alternatively, the number of the microcontrollers constituting the control unit 311 may be one or more.

The CAN communication unit 312 communicates with the zone ECU 106 connected to the communication bus 149 based on the CAN communication protocol.

The memory unit 313 is a storage device for storing various data.

Each of the slave ECUs 115 and 116 includes the control unit 331, the CAN communication unit 332, and the memory unit 333.

The control unit 331 is an electronic control device mainly including a microcontroller with a CPU 341, a ROM 342, a RAM 343, and the like. Various functions of the microcontroller are implemented by the CPU 341 executing programs stored in a non-transitory tangible storage medium. In this example, the ROM 342 corresponds to the non-transitory tangible storage medium in which the programs are stored. A method corresponding to the program is executed by executing the program. Here, a part or all of the functions to be executed by the CPU 341 may be configured as hardware circuitry by one or multiple ICs or the like. Alternatively, the number of the microcontrollers constituting the control unit 331 may be one or more.

The CAN communication unit 332 communicates with the zone ECU 107 connected to the communication bus 150 based on the CAN communication protocol.

The memory unit 333 is a storage device for storing various data.

In the activation table 165 of the central ECU 101, a communication group to be activated (i.e., an activation group) is set for each event. The activation table 165 further includes a correspondence between the activation group and a slave ECU to be set to a wake-up state. The activation table 165 further includes a correspondence between the slave ECU and the electronic fuse connected to the slave ECU.

In addition, each of the central ECU 101, the zone ECUs 104 to 107 and the slave ECUs 108 to 116, 118 is configured to, when detecting that a start condition of an event is met, generate and transmit an NM frame including, as the activation information, information indicating the communication group related to the detected event.

Next, the procedure of the zone management process executed by the control units 191, 211, 231, and 251 of the zone ECUs 104, 105, 106, and 107 will be described. The zone management process is repeatedly executed while the zone ECUs 104, 105, 106, and 107 are activated. In the descriptions below, the procedure of the zone management process for the zone ECU 104 will be described as a representative example.

Figure 12:
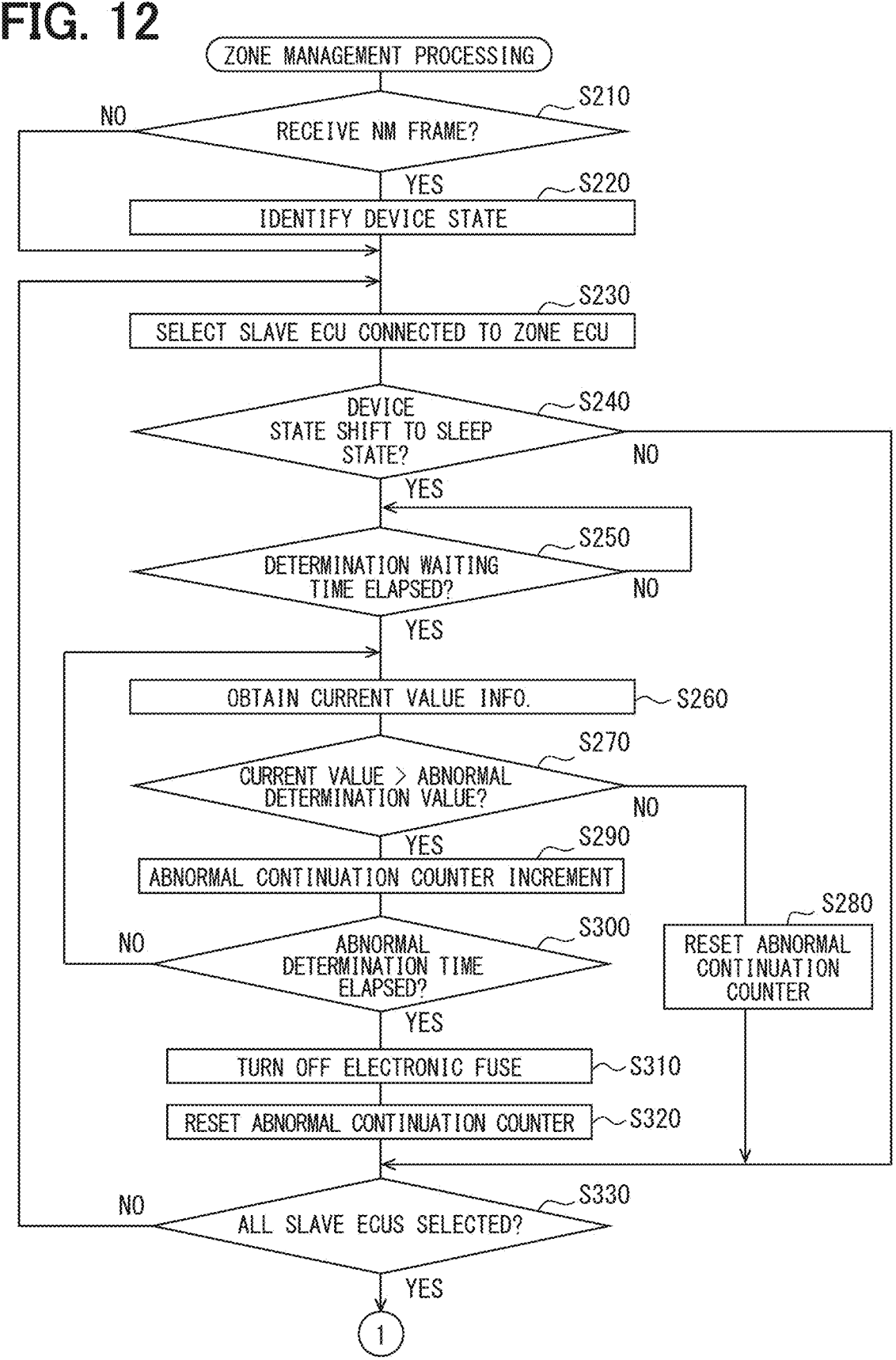
FIG. 12 is a flowchart showing a first part of zone management processing according to the third embodiment.

As shown in FIG. 12, when the zone management process is executed, the CPU 201 of the control unit 191 of the zone EU 104 determines in S210 whether an NM frame has been received. It should be noted that the CPU 201 also determines that an NM frame has been received when the zone ECU 104 generates and transmits the NM frame.

When the NM frame has not been received, the CPU 201 moves the zone management process to S230. On the other hand, when the NM frame has been received, the CPU 201 determines in S220 the states (the device states) of the slave ECUs 108 and 109 disposed downstream of the zone ECU 104 based on the activation information included in the received NM frame, in the same manner as in S20, and moves the processing to S230. Each of the zone ECUs 104 to 107 stores, for each of the communication groups, a table that sets a correspondence between the communication group and at least one slave ECU downstream of the corresponding zone ECU that belong to the communication group.

When the processing proceeds to S230, the CPU 201 selects, as a first determination target ECU, a slave ECU that has not been selected in S230 of the currently executed zone management processing among the slave ECU 108 and 109 connected to the zone ECU 104.

In S240, the CPU 201 determines whether the first determination target ECU is switched from the wake-up state to the sleep state.

Here, when the first determination target ECU is not switched from the wake-up state to the sleep state, the CPU 201 moves the processing to S330. On the other hand, when the first determination target ECU is switched from the wake-up state to the sleep state, the CPU 201 determines in S250 whether a preset determination waiting time has elapsed since the CPU 201 determined in S210 the reception of the NM frame, in the same manner as in S50. The determination waiting times are set separately according to the slave ECUs 108 and 109.

When the determination waiting time has not elapsed, the CPU 201 repeats the process of S250 and waits until the determination waiting time has elapsed. When the determination waiting time has elapsed, the CPU 201 obtains in S260 current value information from the electronic fuse connected to the first determination target ECU. For example, when the first determination target ECU is the slave ECU 108, the CPU 201 obtains the current value information from the electronic fuse 195.

In S270, the CPU 201 determines whether the current value indicated by the current value information obtained in S260 is greater than a preset abnormality determination value, in the same manner as in S70. When the current value is equal to or less than the abnormality determination value, the CPU 201 resets an abnormality continuation counter provided in the RAM 203 in S280, and moves the processing to S330.

On the other hand, when the current value is greater than the abnormality determination value, the CPU 201 increments the abnormality continuation counter in S290.

In step S300, the CPU 201 determines whether the abnormality determination time has elapsed, in the same manner as in S100.

When the abnormality determination time has not elapsed, the CPU 201 moves the processing to S260. On the other hand, when the abnormality determination time has elapsed, the CPU 201 turns off the electronic fuse connected to the first determination target ECU in S310.

The CPU 201 resets the abnormality continuation counter in S320, and moves the processing to S330.

In S330, the CPU 201 determines whether all of the slave ECUs 108 and 109 connected to the zone ECU 104 have been selected in S230. If there is a slave ECU that has not been selected in S230, the CPU 201 moves the processing to S230.

Figure 13:
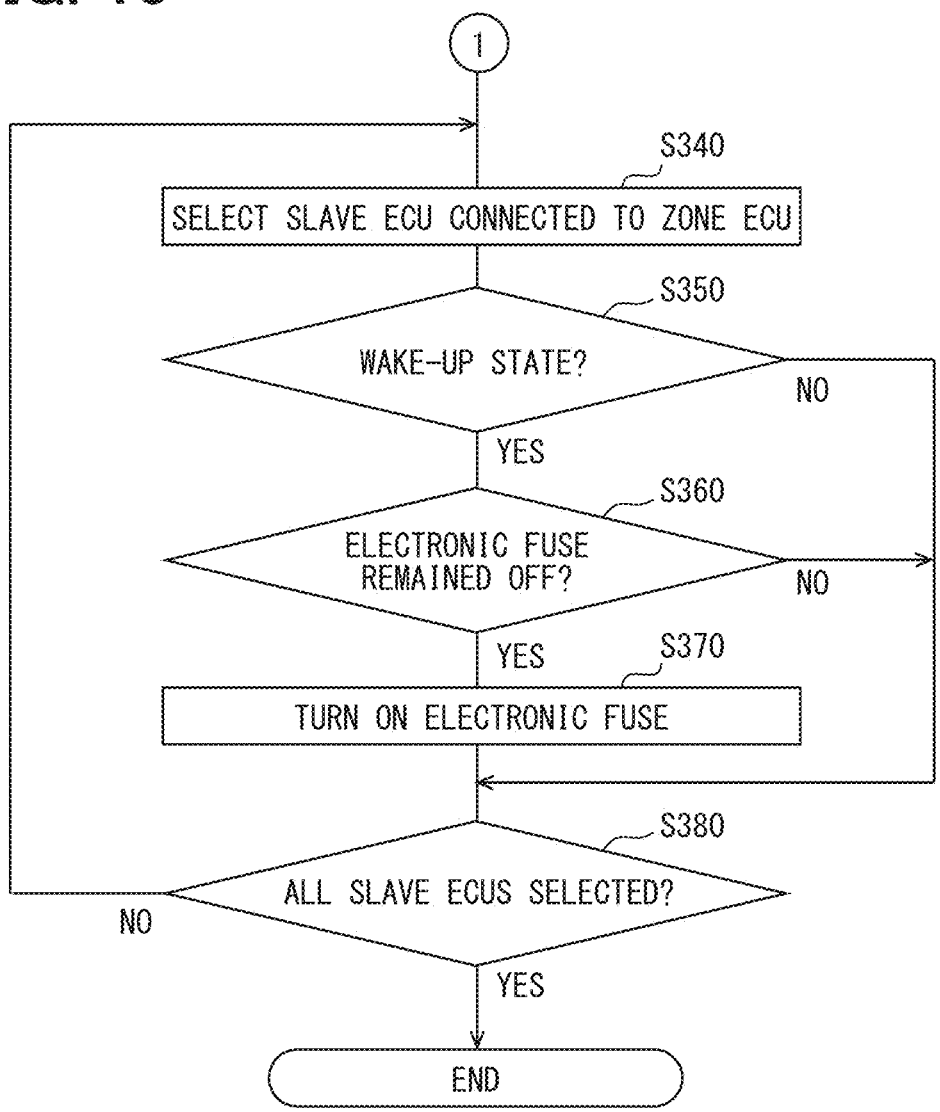
FIG. 13 is a flowchart showing a second part of the zone management processing according to the third embodiment.

On the other hand, when all of the slave ECUs connected to the zone ECU 104 have been selected in S230, the CPU 201 selects, as a second determination target ECU, a slave ECU that has not been selected in S340 of the currently executed zone management processing among the slave ECUs connected to the zone ECU 104, as shown in FIG. 13.

In S350, the CPU 201 determines whether the device state of the second determination target ECU is in the wake-up state based on the determination result in S220. Here, when the device state of the second determination target ECU is not the wake-up state, the CPU 201 moves the processing to S380.

On the other hand, when the device state of the second determination target ECU is the wake-up state, the CPU 201 determines in S360 whether the electronic fuse connected to the second determination target ECU is in the off state. When the electronic fuse connected to the second determination target ECU is in the on state, the CPU 201 moves the processing to S380.

When the electronic fuse connected to the second determination target ECU is in the off state, the CPU 201 turns on the electronic fuse connected to the second determination target ECU in S370 and moves the processing to S380.

In S380, the CPU 201 determines whether all of the slave ECUs connected to the zone ECU 104 have been selected in S340. If there is a slave ECU that has not been selected in S340, the CPU 201 moves the processing to S340. If all of the slave ECUs connected to the zone ECU 104 have been selected in S340, the CPU 201 ends the zone management processing.

The communication system 100 configured in this manner includes the slave ECU 108, the zone ECU 104 electrically connected to the slave ECU 108 to exchange data and configured to control the electronic fuse 195, and the central ECU 101 electrically connected to the zone ECU 104 to exchange data.

The zone ECU 104 includes the control unit 191, the communication unit 192, and the CAN communication unit 193.

The control unit 191 is configured to repeatedly detect a current value consumed by the slave ECU 108 as a consumed current value.

The communication unit 192 and the CAN communication unit 193 are configured to obtain an NM frame including activation information related to the activation of the slave ECU 108.

The control unit 191 is configured to determine, based on the consumed current value and the activation information, whether the preset disconnection determination condition has been met. The disconnection determination condition indicates that current consumption in the slave ECU 108 remains high even in the sleep state.

The control unit 191 is configured to electrically disconnect the electronic fuse 195 when determining that the disconnection determination condition is met.

The communication system 100 described above can interrupt the power supply to the slave ECU 108 based on the consumed current value and the activation information when the slave ECU 108 wastes power even though the slave ECU 108 should be in the sleep state. As a result, the communication system 100 can prevent the slave ECU 108 from wasting power, thereby reducing power consumption in the communication system 100.

In the embodiment described above, the electronic fuse 195 corresponds to the power switch, the battery 117 corresponds to the power source, the slave ECU 108 corresponds to the first controller, each of the central ECU 101 and the zone ECU 104 corresponds to the second controller.

Moreover, the slave ECU 108 corresponds to the slave control device, the zone ECU 104 corresponds to the zone control device, and the central ECU 101 corresponds to the central control device.

Further, the process of S260 corresponds to the process performed by the current detection unit, each of the communication unit 192 and the CAN communication unit 193 corresponds to the management frame obtaining unit, the process of S270 to S300 corresponds to the process performed by the disconnection determination unit, and the process of S310 corresponds to the process performed by the power supply disconnection unit.

(Fourth Embodiment) Hereinafter, a fourth embodiment of the present disclosure will be described with reference to the drawings. Note that in the fourth embodiment, parts different from the third embodiment will be described.

The communication system 100 in the fourth embodiment differs from that in the third embodiment in that the communication system 100 in the fourth embodiment executes central management processing instead of the zone management processing.

Next, the procedure of the central management processing executed by the control unit 151 of the central ECU 101 will be described. The central management processing is repeatedly executed while the central ECU 101 is activated.

Figure 14:
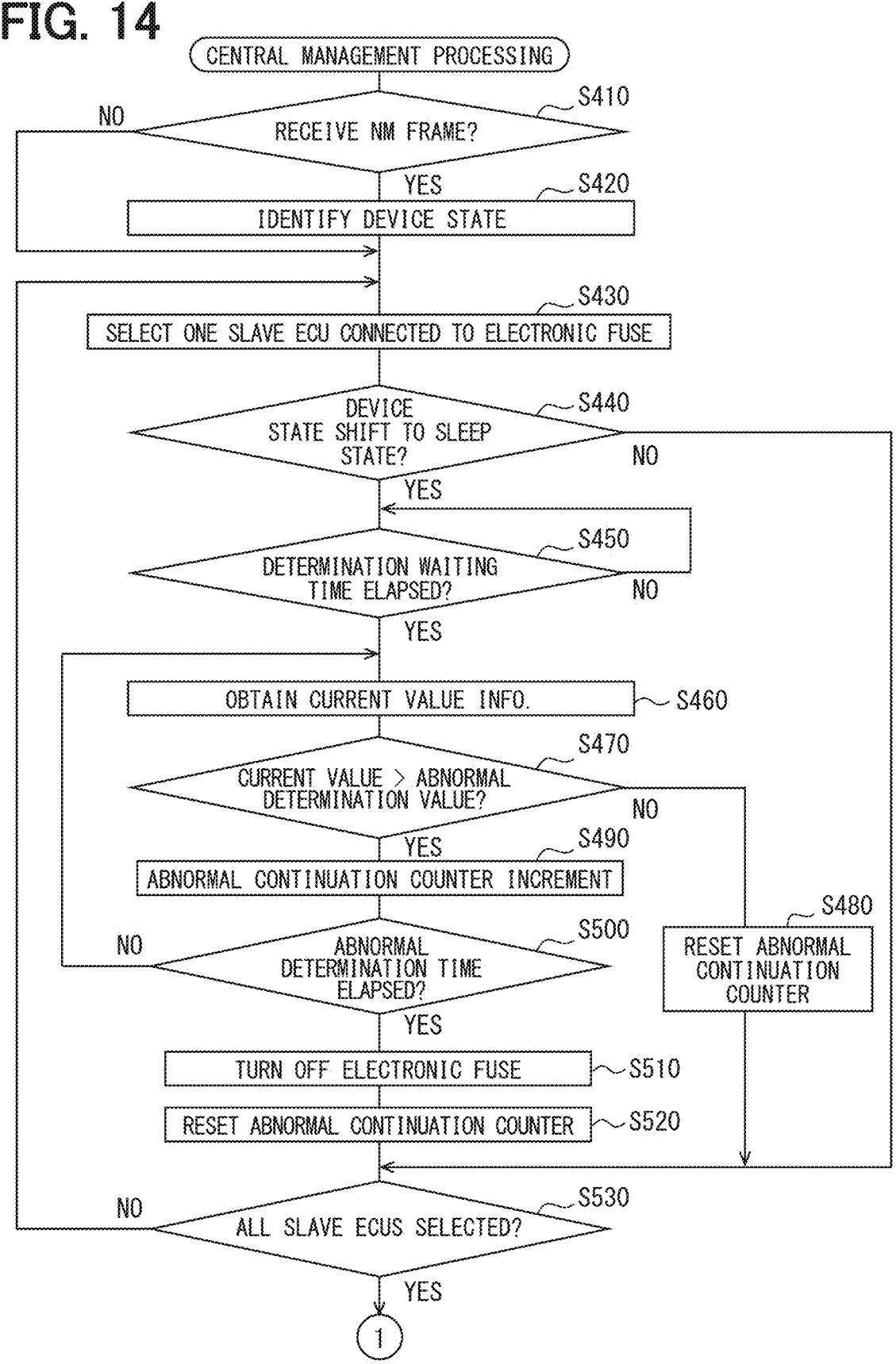
FIG. 14 is a flowchart showing a first part of central management processing according to the fourth embodiment.

As shown in FIG. 14, when the central management processing is executed, the CPU 161 of the control unit 151 determines in S410 whether an NM frame has been received. Note that the CPU 161 determines in S410 that the NM frame has been received if the central ECU 101 generates and transmits the NM frame.

When the NM frame has not been received, the CPU 161 moves the central management process to S430. On the other hand, when the NM frame has been received, the CPU 161 determines in S420 the states (i.e., the device states) of the slave ECUs connected to the electronic fuses (i.e., the slave ECUs 108 to 116) based on the activation information included in the received NM frame, in the same manner as in S20. Then, the processing proceeds to S430.

When the processing proceeds to S430, the CPU 161 selects, as a first determination target ECU, a slave ECU that has not been selected in S430 of the currently executed central management processing among the slave ECUs connected to the electronic fuses.

In S440, the CPU 161 determines whether the first determination target ECU is switched from the wake-up state to the sleep state.

Here, when the first determination target ECU is not switched from the wake-up state to the sleep state, the CPU 161 moves the processing to S530. On the other hand, when the first determination target ECU is switched from the wake-up state to the sleep state, the CPU 161 determines in S450 whether a preset determination waiting time has elapsed since the CPU 161 determined in S450 the reception of the NM frame. The determination waiting time is set for each of the slave ECUs 108 to 116.

When the determination waiting time has not elapsed, the CPU 161 repeats the process of S450 and waits until the determination waiting time has elapsed. When the determination waiting time has elapsed, the CPU 161 obtains in S460 current value information from the electronic fuse connected to the first determination target ECU. For example, when the first determination target ECU is the slave ECU 109, the CPU 161 obtains the current value information from the electronic fuse 196.

In S470, the CPU 161 determines whether the current value indicated by the current value information obtained in S460 is greater than a preset abnormality determination value. When the current value is equal to or less than the abnormality determination value, the CPU 161 resets an abnormality continuation counter provided in the RAM 163 in S480, and moves the processing to S530.

On the other hand, when the current value is greater than the abnormality determination value, the CPU 161 increments the abnormality continuation counter in S490.

In step S500, the CPU 161 determines whether the abnormality determination time has elapsed. When the abnormality determination time has not elapsed, the CPU 161 moves the processing to S460. On the other hand, when the abnormality determination time has elapsed, the CPU 161 turns off the electronic fuse connected to the first determination target ECU in S510.

The CPU 161 resets the abnormality continuation counter in S520, and moves the processing to S530.

In S530, the CPU 161 determines whether all of the slave ECUs connected to the electronic fuses have been selected in S430. If there is a slave ECU that has not been selected in S430, the CPU 161 moves the processing to S430.

Figure 15:
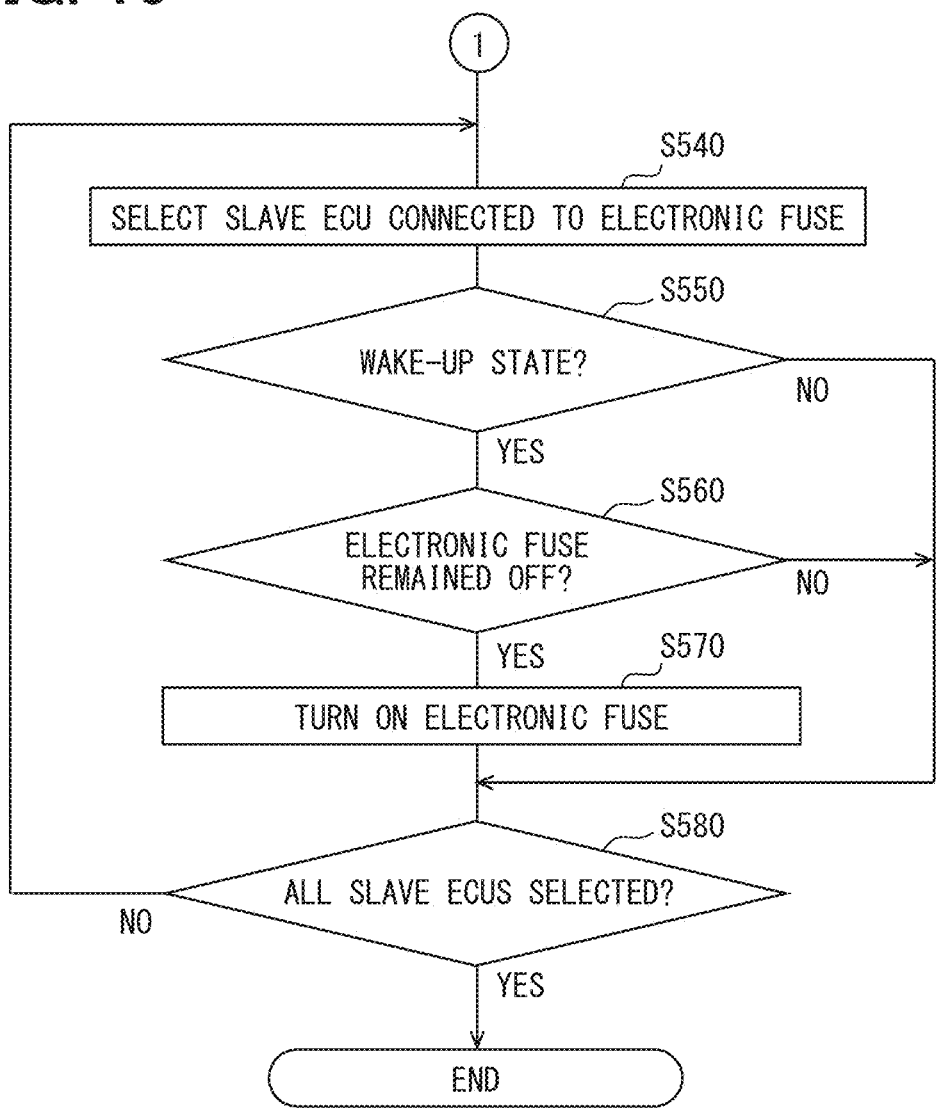
FIG. 15 is a flowchart showing a second part of the central management processing according to the fourth embodiment.

On the other hand, when all of the slave ECUs connected to the electronic fuses have been selected in S430, the CPU 161 selects, as a second determination target ECU, a slave ECU that has not been selected in S540 of the currently executed central management processing among the slave ECUs connected to the electronic fuses, as shown in FIG. 15.

In S550, the CPU 161 determines whether the device state of the second determination target ECU is in the wake-up state based on the determination result in S420. Here, when the device state of the second determination target ECU is not the wake-up state, the CPU 161 moves the processing to S580.

On the other hand, when the device state of the second determination target ECU is the wake-up state, the CPU 161 determines in S560 whether the electronic fuse connected to the second determination target ECU is in the off state. When the electronic fuse connected to the second determination target ECU is in the on state, the CPU 161 moves the processing to S580.

When the electronic fuse connected to the second determination target ECU is in the off state, the CPU 161 turns on the electronic fuse connected to the second determination target ECU in S570 and moves the processing to S580.

In S580, the CPU 161 determines whether all of the slave ECUs connected to the electronic fuses have been selected in S540. If there is a slave ECU that has not been selected in S540, the CPU 161 moves the processing to S540. If all of the slave ECUs connected to the electronic fuses have been selected in S540, the CPU 161 ends the central management processing.

The communication system 100 configured in this manner includes the slave ECU 108, the zone ECU 104 electrically connected to the slave ECU 108 to exchange data and configured to control the electronic fuse 195, and the central ECU 101 electrically connected to the zone ECU 104 to exchange data.

The central ECU 101 includes the control unit 151 and the communication unit 154.

The control unit 151 is configured to repeatedly detect a current value consumed by the slave ECU 108 as a consumed current value.

The communication unit 154 is configured to obtain an NM frame including activation information related to the activation of the slave ECU 108.

The control unit 151 is configured to determine, based on the consumed current value and the activation information, whether the preset disconnection determination condition has been met. The disconnection determination condition indicates that current consumption in the slave ECU 108 remains high even in the sleep state.

The control unit 151 is configured to electrically disconnect the electronic fuse 195 when determining that the disconnection determination condition is met.

The communication system 100 described above can interrupt the power supply to the slave ECU 108 based on the consumed current value and the activation information when the slave ECU 108 wastes power even though the slave ECU 108 should be in the sleep state. As a result, the communication system 100 can prevent the slave ECU 108 from wasting power, thereby reducing power consumption in the communication system 100.

The zone ECU 104 is configured to receive power from the battery 117 via the electronic fuse 173 that is disposed on the power supply path 123 between the electronic fuse 195 and the battery 117. The electronic fuse 173 is configured to selectively switch between the connected state and the disconnected state. And the communication system 100 further includes the upstream power distribution unit 102 having the electronic fuse 173.

The central ECU 101 is configured not to execute control to switch the electronic fuse 173 to the disconnected state.

In the embodiment described above, the process of S460 corresponds to the process performed by the current detection unit, the communication unit 154 corresponds to the management frame obtaining unit, the process of S470 to S500 corresponds to the process performed by the disconnection determination unit, and the process of S510 corresponds to the process performed by the power supply disconnection unit.

Moreover, the electronic fuse 195 corresponds to the first power switch, and the electronic fuse 173 corresponds to the second power switch.

(Fifth embodiment) Hereinafter, a fifth embodiment according to the present disclosure will be described with reference to the drawings. In the fifth embodiment, portions different from the third embodiment will be described.

The communication system 100 of the fifth embodiment differs from that of the third embodiment in that the central ECU 101 executes central upstream management processing.

Next, the procedure of the central upstream management processing executed by the control unit 151 of the central ECU 101 will be described. The central upstream management processing is processing that is repeatedly executed while the central ECU 101 is activated.

Figure 16:
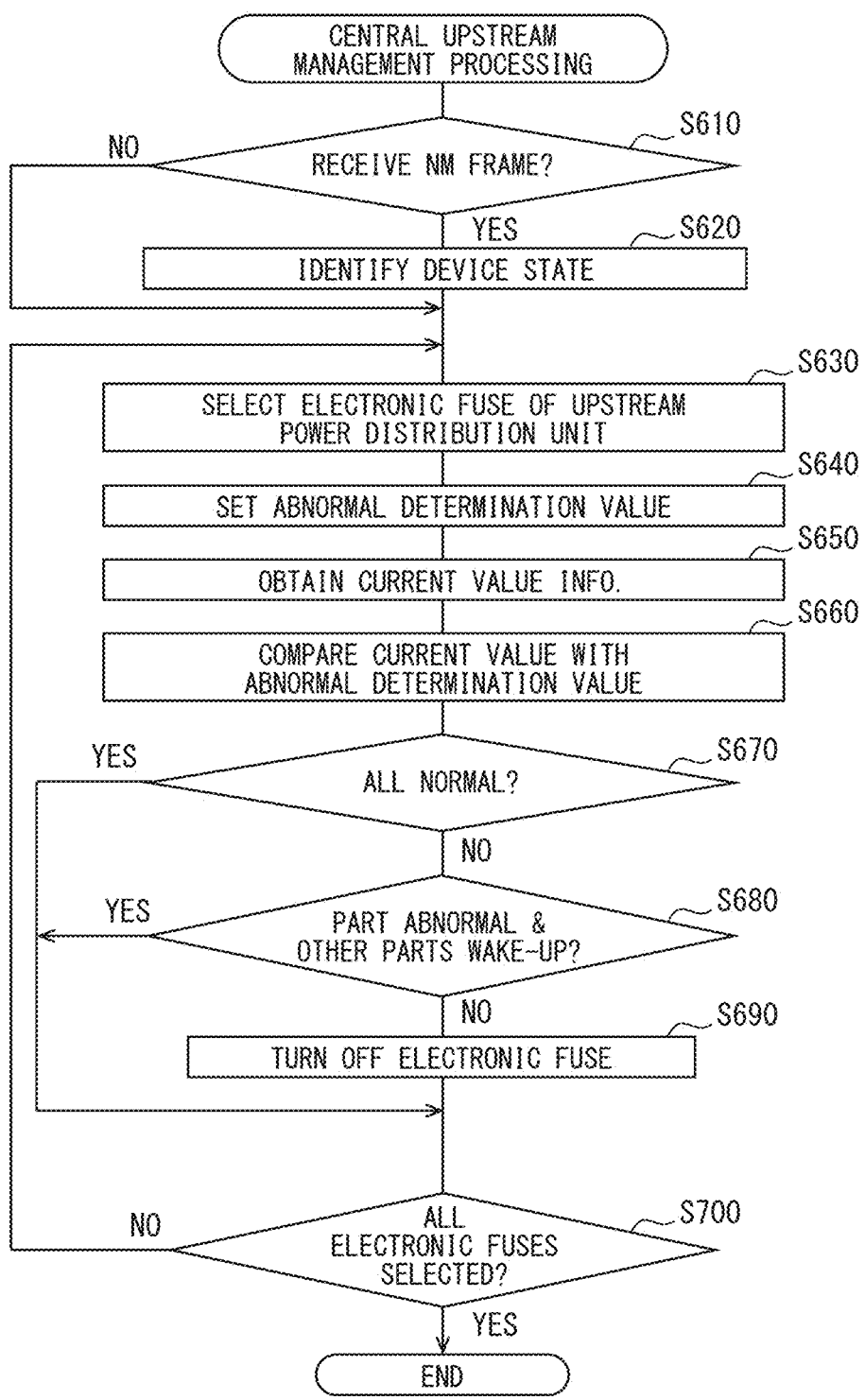
FIG. 16 is a flowchart showing central upstream management processing according to a fifth embodiment.

As shown in FIG. 16, when the central upstream management processing is executed, the CPU 161 of the control unit 151 determines in S610 whether an NM frame has been received. Note that the CPU 161 determines in S610 that the NM frame has been received when the central ECU 101 generates and transmits the NM frame.

When the NM frame has not been received, the CPU 161 moves the processing to S630. On the other hand, when the NM frame has been received, the CPU 161 determines in S620 the states (hereinafter, referred to as device states) of the slave ECUs (i.e., the slave ECUs 108 to 116) connected to the electronic fuses based on the activation information included in the received NM frame, in the same manner as in S20. Then, the processing proceeds to S630.

When the processing proceeds to S630, the CPU 161 selects, as a determination target fuse, an electronic fuse that has not been selected in S630 of the currently executed central upstream management processing among the electronic fuses 173, 174, 183, and 184 built in the upstream power distribution units 102 and 103.

In step S640, the CPU 161 sets an abnormality determination value based on the device states of the zone ECU and the slave ECUs connected to the determination target fuse.

For example, the electronic fuse 173 is connected to the zone ECU 104 and the slave ECUs 108 and 109.

For the zone ECU 104, a wake-up abnormality determination value is predetermined for the wake-up state, and a sleep abnormality determination value is predetermined for the sleep state.

Similarly, for the slave ECU 108, a wake-up abnormality determination value is predetermined for the wake-up state, and a sleep abnormality determination value is predetermined for the sleep state. In addition, for the slave ECU 109, a wake-up abnormality determination value is predetermined for the wake-up state, and a sleep abnormality determination value is predetermined for the sleep state.

Therefore, for example, when the device states of the zone ECU 104 and the slave ECUs 108 and 109 are all in the wake-up state, the abnormality determination value is set as the sum of the wake-up abnormality determination value of the zone ECU 104, the wake-up abnormality determination value of the slave ECU 108, and the wake-up abnormality determination value of the slave ECU 109.

Also, for example, when the device state of the zone ECU 104 is the wake-up state and the device states of the slave ECUs 108, 109 are the sleep state, the abnormality determination value is set as the sum of the wake-up abnormality determination value of the zone ECU 104, the sleep abnormality determination value of the slave ECU 108, and the sleep abnormality determination value of the slave ECU 109.

For each of the zone ECUs 105 to 107 and the slave ECUs 110 to 116, a wake-up abnormality determination value and a sleep abnormality determination value are also predetermined.

In S650, the CPU 161 obtains current information from the target fuse. For example, when the target fuse is the electronic fuse 173, the CPU 161 obtains the current information from the electronic fuse 173.

In S660, the CPU 161 compares the abnormality determination value set in S640 with the current value indicated by the current information obtained in S650.

In S670, the CPU 161 determines whether all of the slave ECUs connected to the target fuse are normal based on the comparison result in S660. For example, when the target fuse is the electronic fuse 173, the slave ECUs connected to the target fuse are the slave ECUs 108 and 109. When the target fuse is the electronic fuse 183, the slave ECUs connected to the target fuse are the slave ECUs 112, 113, and 114.

When the slave ECUs connected to the determination target fuse are all normal, the CPU 161 moves the processing to S700. On the other hand, if at least one of the slave ECUs connected to the target fuse is abnormal, the CPU 161 determines in S680 whether at least one of the other normal slave ECUs is in the wake-up state.

If at least one of the normal slave ECUs is in the wake-up state, the CPU 161 moves the processing to S700. On the other hand, if all of the normal slave ECUs are in the sleep state, the CPU 161 turns off the target fuse in S690, and the processing proceeds to S700.

In S700, the CPU 161 determines whether all of the electronic fuses 173, 174, 183, and 184 built in the upstream power distribution units 102 and 103 have been selected in S630. If there is a slave ECU that has not been selected in S630, the CPU 161 moves the processing to S630. On the other hand, if all of the electronic fuses 173, 174, 183, and 184 built in the upstream power distribution units 102 and 103 have been selected in S630, the CPU 161 ends the central upstream management processing.

Figure 17:
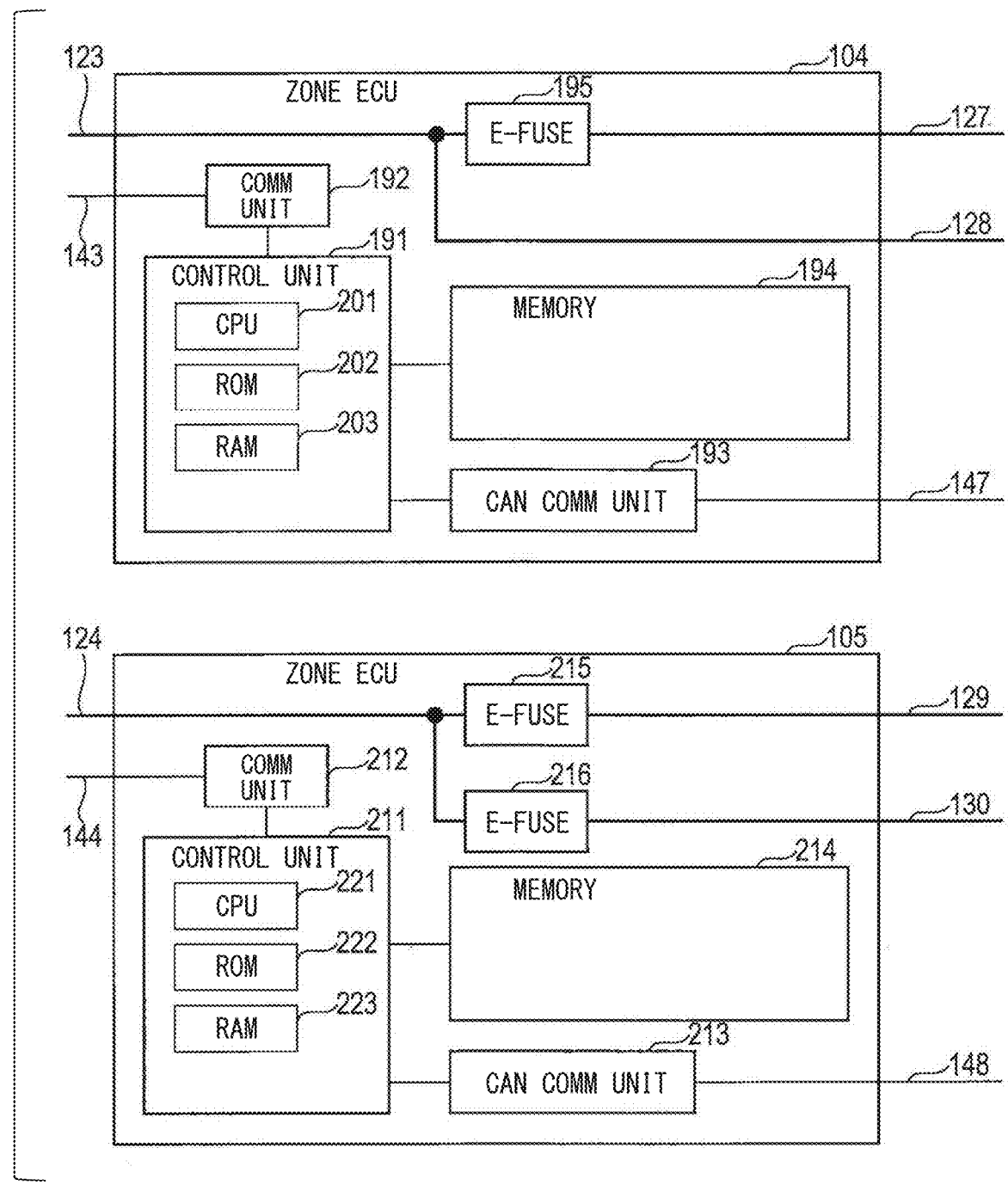
FIG. 17 is a block diagram illustrating the configuration of the zone ECU according to another embodiment.

For example, as shown in FIG. 17, even if the zone ECU 104 does not have the electronic fuse 196 and the slave ECU 109 is connected to the electronic fuse 173 via the power supply path 123 and the power supply path 128, the central upstream management processing of this embodiment can be applied.

For example, when the device state of the zone ECU 104 is the wake-up state and the device states of the slave ECUs 108, 109 are the sleep state, the abnormality determination value is set in S640 as the sum of the wake-up abnormality determination value of the zone ECU 104, the sleep abnormality determination value of the slave ECU 108, and the sleep abnormality determination value of the slave ECU 109.

Then, in S660, the abnormality determination value set in S640 is compared with the current value indicated by the current value information acquired in S650. If the current value exceeds the abnormality determination value, it is determined that the slave ECU 109 is abnormal. Since the device states of both the slave ECU 108 and the slave ECU 109 are the sleep states, the electronic fuse 173 is turned off in S690.

The communication system 100 configured in this manner further includes the upstream power distribution unit 102 having the electronic fuse 173. The central ECU 101 is configured to set an abnormality determination value based on the activation information included in the NM frame. The central ECU 101 is configured to repeatedly detect the value of the current flowing through the electronic fuse 173 (hereinafter, referred to as a second switch current value). The central ECU 101 is configured to switch the electronic fuse 173 between the connected state and the disconnected state based on a comparison result between the second switch current value and the abnormality determination value.

The communication system 100 described above can interrupt the power supply to the slave ECU 108 based on the second switch current value and the activation information when the slave ECU 108 wastes power even though the slave ECU 108 should be in the sleep state. As a result, the communication system 100 can prevent the slave ECU 108 from wasting power, thereby reducing power consumption in the communication system 100.

The communication system 100 includes the slave ECU 109 configured to receive electric power from the battery 117 through the electronic fuse 173. The NM frame includes activation information of the slave ECU 108 and activation information of the slave ECU 109.

The central ECU 101 is configured to turn off the electronic fuse 173 when the second switch current value has a particular value or more even though the slave ECUs 108 and 109 are in the sleep state.

The communication system 100 described above can interrupt the power supply to the slave ECU 109 based on the second switch current value and the activation information when the slave ECU 109 wastes power even though the slave ECU 109 should be in the sleep state. As a result, the communication system 100 can prevent the slave ECU 109 from wasting power, thereby reducing power consumption in the communication system 100.

In the embodiment described above, the electronic fuse 195 corresponds to the first power switch, the electronic fuse 173 corresponds to the second power switch, the slave ECU 108 corresponds to the first slave control device, and the slave ECU 109 corresponds to the second slave control device.

Moreover, the process of S640 corresponds to the process performed by the determination value setting unit, the process of S650 corresponds to the process performed by the second switch current detection unit, and the process of S660 to S690 corresponds to the process performed by the second switch control unit.

The embodiments of the present disclosure have been described above, but the present disclosure is not limited to the above embodiment and can be implemented in various modified forms.

(First Modified Example) In the above embodiment, the power supply is controlled with the electronic fuses 15 to 17, but a relay may be used instead of the electronic fuses 15 to 17. Since the relay cannot detect current, the communication system 1 needs a current detection circuit that detects the value of the current flowing through the power supply paths 18 to 20.

(Second Modified Example) In the above embodiment, the communication system 1 includes a single master ECU. The master ECU is an ECU that includes electronic fuses and is configured to control the operation of the electronic fuses. However, the communication system 1 may include multiple master ECUs. Also, the communication system may include a first master ECU that receives electric power from the battery 7 via an electronic fuse provided in a second master ECU. That is, multiple master ECUs may be installed in cascade manner.

The control unit 11 and the techniques thereof according to the present disclosure may be implemented by one or more special-purposed computers. Such a special-purposed computer may be provided by configuring a processor and a memory programmed to execute one or more functions embodied by a computer program. Alternatively, the control unit 11 and the method thereof described in the present disclosure may be implemented by a dedicated computer provided by configuring a processor with one or more dedicated hardware logic circuits. Alternatively, the control unit 11 and the method thereof described in the present disclosure may be implemented by one or more dedicated computers configured by a combination of a processor and a memory programmed to perform one or a plurality of functions and a processor configured with one or more hardware logic circuits. Further, the computer program may be stored in a computer-readable non-transitory tangible storage medium as instructions to be executed by a computer. The technique for realizing the functions of each unit included in the control unit 11 does not necessarily need to include software, and all the functions may be realized using one or a plurality of hardware circuits.

The multiple functions of one component in the above embodiment may be realized by multiple components, or a function of one component may be realized by the multiple components. In addition, multiple functions of multiple components may be realized by one component, or a single function realized by multiple components may be realized by one component. Moreover, a part of the configuration of the above-described embodiment may be omitted. At least a part of the configuration of the above embodiment may be added to or replaced with a configuration of another embodiment.

In addition to the ECUs 2 to 5, 101-116, and 118 described above, the present disclosure can be archived by various forms such as a system including the ECUs 2 to 5, 101-116, and 118 as components, a program for causing a computer to function as the ECUs 2 to 5, 101-116, and 118, a non-transitory tangible storage medium such as a semiconductor memory storing the program, and a management method.

The invention claimed is:

1. A communication system comprising:
   a first controller configured to receive electric power from a power source through a power switch, the power switch being configured to selectively switch between a connected state in which a power supply path is electrically connected to the power source and a disconnected state in which the power supply path is electrically disconnected from the power source;
   a second controller connected to the first controller to exchange a communication frame and configured to control the power switch, wherein
   the second controller includes:
   a current detection unit configured to repeatedly detect a current value, as a consumed current value, that is consumed by the first controller;
   a management frame obtaining unit configured to obtain a management frame, as the communication frame, that includes activation information related to activation of the first controller;
   a disconnection determination unit configured to determine, based on the consumed current value and the activation information, whether a predetermined disconnection condition is met, the predetermined disconnection condition indicating that the first controller keeps consuming a large amount of power but the first controller is in a sleep state, and
   a power supply disconnection unit configured to switch the power switch to the disconnected state when the disconnection determination unit determines that the predetermined disconnection condition is met.

2. The communication system according to claim 1, wherein
   the second controller further includes a power supply connection unit configured to, after the power supply disconnection unit has switched the power switch to the disconnected state, switch the power switch to the connected state when the activation information in the management frame that is obtained by the management frame obtaining unit indicates that the first controller is activated.

3. The communication system according to claim 1, wherein
   the predetermined disconnection condition is that the consumed current value has exceeded a predetermined abnormality determination value for a predetermined abnormality determination period.

4. The communication system according to claim 1, wherein
   the power switch is an electronic fuse, and
   the current detection unit is configured to detect the consumed current value by obtaining, from the electronic fuse, current value information that indicates a current value flowing through the electronic fuse.

5. The communication system according to claim 1, further comprising:
   a zone control device connected to a slave control device that is the first controller to exchange data with the slave control device and configured to control the power switch; and
   a central control device connected to the zone control device to exchange data with the zone control device, wherein
   the zone control device or the central control device includes the current detection unit, the management frame obtaining unit, the disconnection determination unit, and the power supply disconnection unit.

6. The communication system according to claim 5, further comprising
   an upstream power distribution unit, wherein
   the power switch is a first power switch,
   the zone control device is configured to receive electric power from the power source through a second power switch of the upstream power distribution unit, the second power switch being disposed on the power supply path between the power source and the first power switch and configured to selectively switch between the connected state and the disconnected state, and
   the central control device is configured not to switch the second power switch to the disconnected state.

7. The communication system according to claim 5, further comprising
   an upstream power distribution unit, wherein
   the power switch is a first power switch,
   the zone control device is configured to receive electric power from the power source through a second power switch of the upstream power distribution unit, the second power switch being disposed on the power supply path between the power source and the first power switch and configured to selectively switch between the connected state and the disconnected state, wherein
   the central control device includes:
   a determination value setting unit configured to set an abnormality determination value based on the activation information included in the management frame;
   a second switch current detection unit configured to repeatedly detect a second switch current value of a current flowing through the second power switch; and
   a second switch control unit configured to switch the second power switch between the connected state and the disconnected state based on a comparison result between the second switch current value and the abnormality determination value.

8. The communication system according to claim 7, wherein
   the slave control device is a first slave control device connected to the first power switch,
   the communication system further comprises a second slave control device configured to receive electric power from the power source through the second power switch, and
   the second switch control unit of the central control device is further configured to switch the second power switch to the disconnected state when the second switch current value has a particular value or more while the first slave control device and the second slave control device are in the sleep state.

9. An electronic control device connected to another control device to exchange a communication frame with the other control device and configured to control a power switch through which electric power is supplied from a power source to the other control device, the power switch being configured to selectively switch between a connected state in which a power supply path is electrically connected to the power source and a disconnected state in which the power supply path is electrically disconnected from the power source, the electronic control device comprising:
a current detection unit configured to repeatedly detect a current value, as a consumed current value, that is consumed by the other control device;
a management frame obtaining unit configured to obtain a management frame, as the communication frame, that includes activation information related to activation of the other control device;
a disconnection determination unit configured to determine, based on the consumed current value and the activation information, whether a predetermined disconnection condition is met, the predetermined disconnection condition indicating that the other control device keeps consuming a large amount of power but the other control device is in a sleep state; and
a power supply disconnection unit configured to switch the power switch to the disconnected state when the disconnection determination unit determines that the predetermined disconnection condition is met.

* * * * *